(12) United States Patent
Wang et al.

(10) Patent No.: US 11,291,064 B2
(45) Date of Patent: Mar. 29, 2022

(54) COMMUNICATION METHOD, NETWORK NODE, AND RADIO ACCESS NETWORK SYSTEM

(71) Applicant: HUAWEI TECHNOLOGIES CO., LTD., Guangdong (CN)

(72) Inventors: Rui Wang, Shanghai (CN); Mingzeng Dai, Shanghai (CN); Hongzhuo Zhang, Shanghai (CN); Xudong Yang, Shanghai (CN); Qinghai Zeng, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 114 days.

(21) Appl. No.: 16/716,112

(22) Filed: Dec. 16, 2019

(65) Prior Publication Data

US 2020/0120735 A1    Apr. 16, 2020

Related U.S. Application Data

(63) Continuation of application No. PCT/CN2018/091391, filed on Jun. 15, 2018.

(30) Foreign Application Priority Data

Jun. 16, 2017 (CN) .......................... 201710459213.4

(51) Int. Cl.
*H04W 76/15* (2018.01)
*H04W 76/27* (2018.01)
(Continued)

(52) U.S. Cl.
CPC .......... *H04W 76/15* (2018.02); *H04W 76/27* (2018.02); *H04W 80/02* (2013.01); *H04W 80/08* (2013.01)

(58) Field of Classification Search
CPC ..... H04W 76/15; H04W 76/27; H04W 80/02; H04W 80/08; H04W 88/085;
(Continued)

(56) References Cited

U.S. PATENT DOCUMENTS

2015/0098441 A1*  4/2015  Peng .................... H04L 5/0005
                                                  370/330
2016/0037526 A1*  2/2016  Kim ...................... H04L 5/001
                                                  370/329
(Continued)

FOREIGN PATENT DOCUMENTS

CN   102291837 A    12/2011
EP     2849359 A1    3/2015
(Continued)

OTHER PUBLICATIONS

3GPP TR 38.801 V14.0.0 (Mar. 2017), "3rd Generation Partnership Project;Technical Specification Group Radio Access Network;Study on new radio access technology: Radio access architecture and interfaces(Release 14)," Mar. 2017, 91 pages.
(Continued)

*Primary Examiner* — Will W Lin
(74) *Attorney, Agent, or Firm* — Fish & Richardson P.C.

(57) ABSTRACT

Example communication methods and apparatus are described. One example method includes that a first network node receives first configuration information from a second network node. The first configuration information includes a serving cell set configured for a terminal device, and indicates a status of a secondary cell. The first network node sends the first configuration information and first indication information to the terminal device, where the first indication information includes information about a status of at least one secondary cell, and the at least one secondary cell belongs to the serving cell set.

13 Claims, 9 Drawing Sheets

(51) Int. Cl.
*H04W 80/02* (2009.01)
*H04W 80/08* (2009.01)

(58) Field of Classification Search
CPC ..... H04W 92/12; H04W 24/10; H04W 80/06; H04W 48/08; H04L 5/0048; H04L 5/0094; H04L 5/001; H04L 5/0098
See application file for complete search history.

(56) References Cited

U.S. PATENT DOCUMENTS

| | | | |
|---|---|---|---|
| 2016/0119930 A1* | 4/2016 | Yan | H04W 74/006 370/329 |
| 2017/0127362 A1 | 5/2017 | Tavildar et al. | |
| 2017/0150447 A1* | 5/2017 | Kim | H04W 52/0241 |
| 2018/0110082 A1* | 4/2018 | Saily | H04W 76/25 |
| 2020/0120732 A1* | 4/2020 | Teyeb | H04W 76/15 |
| 2021/0006322 A1* | 1/2021 | Agiwal | H04B 7/0697 |

FOREIGN PATENT DOCUMENTS

| | | | |
|---|---|---|---|
| JP | 2015511083 A | 4/2015 | |
| WO | 2016079905 A1 | 5/2016 | |

OTHER PUBLICATIONS

Office Action issued in Korean Application No. 2020-7000922 dated Jan. 28, 2021, 12 pages (with English translation).
Huawei, "UE context management on FI," 3GPP TSG-RAN3 Meeting #96, R3-171852; Hangzhou, China, XP051276630, May 15-19, 2017, 4 pages.
3GPP TS 36.331 V14.2.2 (Apr. 2017), "3rd Generation Partnership Project; Technical Specification Group Radio Access Network; Evolved Universal Terrestrial Radio Access (E-UTRA); Radio Resource Control (RRC); Protocol specification (Release 14)," XP051306279, Jun. 2017, 721 pages.
3GPP TS 36.321 V14.2.1 (Mar. 2017), "3rd Generation Partnership Project; Technical Specification Group Radio Access Network; Evolved Universal Terrestrial Radio Access (E-UTRA); Medium Access Control (MAC) protocol specification (Release. 14)," XP051306272, Jun. 2017, 106 pages.
Extended European Search Report issued in European Application No. 18817571.5 dated Jun. 5, 2020, 13 pages.
CMCC, "NR RAN Functional Description", GPP TSG RAN WG3 # 92 R3-161267 , May 27, 2016, 6 pages.
3GPP TS 38.331 V0.0.3; 3rd Generation Partnership Project, Technical Specification Group Radio Access Network, NR, Radio Resource Control (RRC), Protocol specification(Release 15), May 2017, 20 pages.
3GPP TS 37.340 V0.1.1 (Jun. 2017), 3rd Generation Partnership Project; Technical Specification Group Radio Access Network; Evolved Universal Terrestrial Radio Access (E-UTRA) and NR, Multi-connectivity; Stage 2(Release 15), Jun. 2017, 30 pages.
PCT International Search Report and Written Opinion in International Application No. PCT/CN2018/091,391, dated Aug. 29, 2018, 16 pages (With English Translation).
CATT, "NR UP Stack Options for Intra-gNB Multi-Connectivity," 3GPP TSG-RAN WG2 Meeting #97, R2-1700973, Athens, Greece, Feb. 13-17, 2017, 4 pages.
Office Action issued in Japanese Application No. 2019-569367 dated May 25, 2021, 5 pages (with English translation).
3GPP TS 36.331 V14.2.2 (Apr. 2017), "3rd Generation Partnership Project; Technical Specification Group Radio Access Network; Evolved Universal Terrestrial Radio Access (E-UTRA); Radio Resource Control (RRC); Protocol specification (Release 14)," Apr. 2017, 721 pages.
3GPP TS 36.321 V14.2.1 (Mar. 2017), "3rd Generation Partnership Project; Technical Specification Group Radio Access Network; Evolved Universal Terrestrial Radio Access (E-UTRA); Medium Access Control (MAC) protocol specification (Release 14)," Mar. 2017, 106 pages.
Office Action issued in Korean Application No. 2020-7000922 dated Aug. 30, 2021, 4 pages (with English translation).

\* cited by examiner understand# COMMUNICATION METHOD, NETWORK NODE, AND RADIO ACCESS NETWORK SYSTEM

CROSS-REFERENCE TO RELATED APPLICATIONS

This application is a continuation of International Application No. PCT/CN2018/091391, filed on Jun. 15, 2018, which claims priority to Chinese Patent Application No. 201710459213.4, filed on Jun. 16, 2017. The disclosures of the aforementioned applications are hereby incorporated by reference in their entireties.

TECHNICAL HELD

This application relates to the communications field, and more specifically, to a communication method, a network node, and a radio access network system.

BACKGROUND

To further increase a transmission bandwidth, a carrier aggregation (CA) technology is introduced to long term evolution advanced (LTE-A) system. A main concept of carrier aggregation is combining a plurality of component carriers (CC) into one carrier with a greater bandwidth, to support high-speed data transmission. In the prior art, a base station may configure carrier aggregation, determine an active/inactive state of a secondary cell, and notify a terminal device of the active/inactive state of the secondary cell by using signaling.

However, the development of a fifth generation (5G) communications network changes a network architecture. For example, concepts of a centralized unit (CU) and a distributed unit (DU) that are split from each other are introduced. In other words, a radio access network device (for example, a base station) is split into two parts: a CU and a DU. Different protocol layers are deployed in the CU and the DU. For example, a radio resource control (RRC) layer is deployed in the CU, and a media access control (MAC) layer, a physical (PHY) layer, and the like are deployed in the DU. For another example, in the 5G network, a new technology is also developed for a new relay node. For example, a protocol stack architecture of only a layer 2 (for example, including a radio link control (RLC) layer and a MAC layer) and a layer 1 (for example, including a PHY layer) is deployed in the relay node, and a protocol stack above the layer 2, such as an RRC layer, is not deployed. Therefore, data or signaling generated by a host base station needs to be forwarded to a terminal device by the relay node.

The original carrier aggregation configuration method is no longer applicable to the new network architecture. How to configure carrier aggregation for a terminal device in the new network architecture becomes a technical problem to be urgently resolved.

SUMMARY

This application provides a communication method, a network node, and a radio access network system, so that carrier aggregation can be configured for a terminal device in a new network architecture.

According to a first aspect, a communication method is provided. The method is applied to a radio access network system including a first network node and a second network node, the first network node communicates with the second network node through a first communications interface, and the method includes:

receiving, by the first network node, first configuration information from the second network node, where the first configuration information includes a serving cell set configured for a terminal device, the serving cell set includes at least one secondary cell, the first configuration information further indicating a status of the secondary cell, the status of the secondary cell is an active state or an inactive state, and the first configuration information is generated by the second network node at a first protocol layer;

sending, by the first network node, the first configuration information to the terminal device; and sending, by the first network node, first indication information to the terminal device, where the first indication information includes information about a status of at least one first secondary cell, the at least one first secondary cell belongs to the serving cell set, and the first indication information is generated by the first network node at a second protocol layer.

The at least one first secondary cell included in the first indication information may be a subset of the serving cell set in the first configuration information, or may be all secondary cells in the serving cell set. This is not specifically limited in this application.

In a possible design, the first indication information may include all the secondary cells in the serving cell set, and is used to indicate a status of each secondary cell. In another possible design, the first indication information may include some secondary cells in the serving cell set, and is used to indicate a status of each of the some secondary cells. In another possible design, the first indication information may include some secondary cells in the serving cell set, and the some secondary cells are determined by the first network node or the second network node and are set to the active state or the inactive state.

Therefore, in this embodiment of this application, the second network node generates the first configuration information at the first protocol layer, and indicates, by using the first network node, the first configuration information including the serving cell set to the terminal device; and the first network node generates the first indication information at the second protocol layer, and sends the first indication information to notify the terminal device of the at least one first secondary cell that is set to an active/inactive state, so that the terminal device updates a status of the at least one first secondary cell after receiving the first indication information, so as to perform data transmission by using an active secondary cell. Therefore, carrier aggregation is configured for the terminal device in a new network architecture, and this helps increase a transmission bandwidth of the terminal device.

In this embodiment of this application, the at least one first secondary cell from the serving cell set may be determined by the first network node or the second network node.

If the second network node determines the status of the at least one first secondary cell, optionally, the method further includes:

receiving, by the first network node, second indication information sent by the second network node, where the second indication information includes the at least one first secondary cell, or includes the at least one first secondary cell and the status of the at least one first secondary cell.

In other words, after determining the at least one first secondary cell, the second network node sends the second indication information to notify the first network node of the at least one first secondary cell, and the first network node generates the first indication information based on the second indication information, to notify the terminal device of the active/inactive state of the at least one first secondary cell.

If the first network node determines the status of the at least one first secondary cell, optionally, the method further includes:

determining, by the first network node, the status of the at least one first secondary cell from the serving cell set based on a measurement result, where the measurement result includes at least one of the following:

a first measurement result of the first protocol layer from the terminal device;

a second measurement result of a third protocol layer from the terminal device; and a third measurement result of an uplink channel that is obtained through measurement by the first network node based on a signal sent by the terminal device.

The first network node determines the status of the at least one first secondary cell from the serving cell set, so that the first indication information can be directly generated based on a result of the determining. This is relatively simple and convenient.

Determining the status of the at least one first secondary cell based on the measurement result is a possible implementation. However, it should be understood that, this is only a possible implementation provided in this application, and shall not constitute any limitation on this application.

It should be further understood that, the measurement results illustrated above are merely used for example description, and shall not constitute any limitation on this application.

In this application, different protocol layers may be separately deployed in the first network node and the second network node. In a possible implementation, at least the first protocol layer is deployed in the second network node, and at least the second protocol layer and the third protocol layer are deployed in the first network node.

For example, the first protocol layer may be a radio resource control (RRC) layer, the second protocol layer may be a media access control (MAC) layer, and the third protocol layer may be a physical (PHY) layer.

It should be understood that the first protocol layer, the second protocol layer, and the third protocol layer illustrated above are merely used for example description, and shall not constitute any limitation on this application. The first protocol layer and the second protocol layer may be alternatively other protocol layers defined in an existing protocol (for example, an LTE protocol) or a future protocol. This is not specifically limited in this application.

Optionally, when the first network node receives a first measurement report of the first protocol layer from the terminal device, the first measurement result may be obtained by performing the following steps:

sending, by the first network node to the second network node, the first measurement report reported by the terminal device;

generating, by the second network node, the first measurement result based on the first measurement report; and receiving, by the first network node, the first measurement result sent by the second network node.

The first network node may determine the status of the at least one first secondary cell based on at least one of the foregoing measurement results, so that accuracy of the determining can be improved.

Further, optionally, the first indication information is generated by the first network node at the second protocol layer.

For example, the first indication information may be carried in a MAC control element (CE).

Therefore, the first network node sends the first indication information to the terminal device by using a MAC layer message, to indicate an active/inactive state of a secondary cell. This can improve real-time performance of configuration validation.

In this embodiment of the present invention, the serving cell set may be determined by the first network node or the second network node.

If the serving cell set is determined by the second network node, optionally, the method further includes:

receiving, by the first network node, second configuration information from the second network node, where the second configuration information includes secondary-cell identity information and a secondary-cell index of the serving cell set configured by the second network node for the terminal device.

Optionally, the second configuration information further indicating the status of the secondary cell, where the status of the secondary cell is the active state or the inactive state.

If the serving cell set is determined by the first network node, optionally, the method further includes:

sending, by the first network node, third configuration information to the second network node, where the third configuration information is used to indicate, to the second network device, the serving cell set configured for the terminal device, the third configuration information further indicating the status of the secondary cell, and the status of the secondary cell is the active state or the inactive state.

Optionally, the method further includes:

determining, by the first network node, the serving cell set based on the measurement result.

Specific content of the measurement result has been described in detail in the foregoing description. To avoid repetition, details are not described herein again.

Optionally, the method further includes:

sending, by the first network node, third indication information to the second network node, where the third indication information is used to notify the second network node of the at least one first secondary cell and the status of the at least one first secondary cell that are in the first indication information.

In other words, after determining the status of the at least one first secondary cell for the terminal device, the first network node may notify the second network node of the status of the at least one first secondary cell, so that the second network node maintains an active/inactive state of the at least one first secondary cell of the terminal device.

Optionally, the second configuration information and the second indication information are carried in a same message.

Optionally, the second configuration information, the second indication information, and the third indication information are all generated by the second network node based on a protocol supported by the first communications interface.

In this application, the first communications interface may be an F1 interface, all the information illustrated above may be carried in an F1 interface control plane (denoted as an F1CP) message, and further, the F1 interface control plane message is an F1AP message; or may be carried in an F1 interface user plane (denoted as an F1UP) message.

Optionally, the F1 interface control plane message is carried in a transport layer protocol of SCTP, and the F1 interface user plane message is carried in a transport layer protocol of GTP-U.

In this application, the second network node may indicate the serving cell set to the terminal device by using an RRC message. A one-to-one mapping relationship between secondary-cell identity information, a secondary-cell index, and secondary-cell frequency information is recorded in the first configuration information carried in the RRC message, so that the terminal device stores the one-to-one mapping relationship. The first network node may indicate the status of the at least one first secondary cell in the serving cell set to the terminal device by using the MAC CE. The first indication information carried in the MAC CE carries a secondary-cell index and secondary-cell status information, so that the terminal device finds a corresponding secondary cell at a corresponding frequency based on the pre-stored one-to-one mapping relationship between secondary-cell identity information, a secondary-cell index, and secondary-cell frequency information. The second network node notifies the one-to-one mapping relationship between secondary-cell identity information, a secondary-cell index, and secondary-cell frequency information in advance by using the RRC message, and then the first network node indicates, in the MAC CE by using the secondary-cell index, a secondary cell that is set to the active state, so that overheads of the first indication information in the MAC CE can be reduced. In addition, the terminal device is notified of the status of the at least one first secondary cell by using the MAC CE, and this can improve real-time performance of configuration validation. In other words, a secondary cell can be configured for the terminal device in real time based on a current network status. Therefore, the transmission bandwidth of the terminal device can be further improved.

According to a second aspect, a communication method is provided. The method is applied to a radio access network system, including a first network node and a second network node, and the first network node communicates with the second network node through a first communications interface. The method includes: sending, by the second network node, first configuration information to the first network node, where the first configuration information includes a serving cell set configured for a terminal device, the serving cell set includes at least one secondary cell, the first configuration information further indicating a status of the secondary cell, the status of the secondary cell is an active state or an inactive state, and the first configuration information is generated by the second network node at a first protocol layer; and sending, by the second network node, second configuration information to the first network node, where the second configuration information includes secondary-cell identity information and a secondary-cell index of the serving cell set configured by the second network node for the terminal device. At least one first secondary cell included in first indication information may be a subset of the serving cell set in the first configuration information, or may be all secondary cells in the serving cell set. This is not specifically limited in this application.

In a possible design, the first indication information may include all the secondary cells in the serving cell set, and is used to indicate a status of each secondary cell. In another possible design, the first indication information may include some secondary cells in the serving cell set, and is used to indicate a status of each of the some secondary cells. In still another possible design, the first indication information may include some secondary cells in the serving cell set, and the some secondary cells are determined by the first network node or the second network node and are set to the active state or the inactive state.

Therefore, in this embodiment of this application, the second network node generates the first configuration information at the first protocol layer, and indicates, by using the first network node, the first configuration information including the serving cell set to the terminal device; and the first network node generates the first indication information at a second protocol layer, and sends the first indication information to notify the terminal device of the at least one first secondary cell that is set to an active/inactive state, so that the terminal device updates a status of the at least one first secondary cell after receiving the first indication information, so as to transmit data by using an active secondary cell. Therefore, carrier aggregation is configured for the terminal device in a new network architecture, and this helps increase a transmission bandwidth of the terminal device. In this embodiment of this application, the at least one first secondary cell from the serving cell set may be determined by the first network node or the second network node.

Optionally, the second configuration information further indicating the status of the secondary cell, where the status of the secondary cell is the active state or the inactive state.

In this embodiment, the second network node determines the status of the at least one first secondary cell. Optionally, the method further includes:

determining, by the second network node, the status of the at least one first secondary cell from the serving cell set based on a measurement result.

Optionally, the measurement result includes at least one of the following:

a first measurement result of the first protocol layer from the terminal device;

a second measurement result of a third protocol layer from the terminal device; and a third measurement result of an uplink channel that is reported by the first network node and that is obtained through measurement based on a signal sent by the terminal device.

Determining the status of the at least one first secondary cell based on the measurement result is a possible implementation. However, it should be understood that, this is only a possible implementation provided in this application, and shall not constitute any limitation on this application.

It should be further understood that, the measurement results illustrated above are merely used for example description, and shall not constitute any limitation on this application.

In this application, different protocol layers may be separately deployed in the first network node and the second network node. In a possible implementation, at least the first protocol layer is deployed in the second network node, and at least the second protocol layer and the third protocol layer are deployed in the first network node.

For example, the first protocol layer may be a radio resource control (radio resource control, RRC) layer, the second protocol layer may be a media access control (media access control, MAC) layer, and the third protocol layer may be a physical (physical, PHY) layer.

It should be understood that the first protocol layer, the second protocol layer, and the third protocol layer illustrated above are merely used for example description, and shall not constitute any limitation on this application. The first protocol layer and the second protocol layer may be alternatively other protocol layers defined in an existing protocol (for example, an LTE protocol) or a future protocol. This is not specifically limited in this application.

Optionally, the second network node may obtain the second measurement result of the third protocol layer from the terminal device by performing the following step:

receiving, by the second network node, the second measurement result sent by the first network node, where the second measurement result is determined by the first network node based on a measurement report, of the third protocol layer, reported by the terminal device.

The second network node may determine, based on at least one of the foregoing measurement results, a secondary cell that is set to the active state, so that accuracy of the determining can be improved.

In this embodiment of the present invention, the serving cell set may be determined by the first network node or the second network node.

If the serving cell set is determined by the second network node, optionally, the method further includes:

sending, by the second network node, the second configuration information to the first network node, where the first network node learns, by using the second configuration information, of the serving cell set configured by the second network node for the terminal device, where the second configuration information further indicating the status of the secondary cell, and the status of the secondary cell is the active state or the inactive state.

Optionally, the method further includes:

determining, by the second network node, the serving cell set based on the measurement result.

Specific content of the measurement result has been described in detail in the foregoing description. To avoid repetition, details are not described herein again.

If the serving cell set is determined by the first network node, optionally, the method further includes:

receiving, by the second network node, third configuration information sent by the first network node, where the third configuration information is used to indicate, to the second network node, the serving cell set configured for the terminal device, the third configuration information further indicating the status of the secondary cell, and the status of the secondary cell is the active state or the inactive state.

Optionally, the method further includes:

receiving, by the second network node, third indication information sent by the first network node, where the third indication information is used to notify the second network node of the at least one first secondary cell and the status of the at least one first secondary cell that are in the first indication information.

In other words, after notifying the terminal device of the status of the at least one first secondary cell, the first network node may notify the second network node of the status of the at least one first secondary cell, so that the second network node maintains an active/inactive state of the secondary cell of the terminal device.

Optionally, the second configuration information and the second indication information are carried in a same message.

Optionally, the second configuration information, the second indication information, and the third indication information are all generated by the CU based on a protocol supported by the first communications interface.

In this application, the first communications interface may be an F1 interface, all the information illustrated above may be carried in an F1 interface control plane (denoted as an F1CP) message, and further, the F1 interface control plane message is an F1AP message; or may be carried in an F1 interface user plane (denoted as an F1UP) message.

Optionally, the F1 interface control plane message is carried in a transport layer protocol of SCTP, and the F1 interface user plane message is carried in a transport layer protocol of GTP-U.

In this application, the second network node may indicate the serving cell set to the terminal device by using an RRC message. A one-to-one mapping relationship between secondary-cell identity information, a secondary-cell index, and secondary-cell frequency information is recorded in the first configuration information carried in the RRC message, so that the terminal device stores the one-to-one mapping relationship. The first network node may indicate the status of the at least one first secondary cell in the serving cell set to the terminal device by using a MAC CE. The first indication information carried in the MAC CE carries a secondary-cell index, so that the terminal device finds a corresponding secondary cell at a corresponding frequency based on the pre-stored one-to-one mapping relationship between secondary-cell identity information, a secondary-cell index, and secondary-cell frequency information. The second network node notifies the one-to-one mapping relationship between secondary-cell identity information, a secondary-cell index, and secondary-cell frequency information in advance by using the RRC message, and then the first network node indicates, in the MAC CE by using the secondary-cell index, a secondary cell that is set to the active state, so that an overhead of the first indication information in the MAC CE can be reduced. On the other hand, the terminal device is notified of the status of the at least one first secondary cell by using the MAC CE, and this can improve real-time performance of configuration validation. In other words, a secondary cell can be configured for the terminal device in real time based on a current network status. Therefore, the transmission bandwidth of the terminal device can be further improved.

According to a third aspect, a network node is provided. The network node includes a receiving module and a sending module, to perform the communication method in any one of the first aspect or the possible implementations of the first aspect. The sending module is configured to perform a transmission-related function, and the receiving module is configured to perform a reception-related function.

According to a fourth aspect, a network node is provided. The network node includes a transceiver, a processor, and a memory. The processor is configured to control the transceiver to receive and send a signal. The memory is configured to store a computer program. The processor is configured to invoke the computer program from the memory and run the computer program, so that the network node performs the method in any one of the first aspect or the possible implementations of the first aspect.

In a design, the network node is a communications chip, the receiving unit may be an input circuit or interface of the communications chip, and the sending unit may be an output circuit or interface of the communications chip.

According to a fifth aspect, a network node is provided. The network node includes a receiving module and a sending module, to perform the communication method in any one of the second aspect or the possible implementations of the second aspect. The sending module is configured to perform a transmission-related function, and the receiving module is configured to perform a reception-related function.

According to a sixth aspect, a network node is provided. The network node includes a transceiver, a processor, and a memory. The processor is configured to control the transceiver to receive and send a signal. The memory is configured to store a computer program. The processor is configured to invoke the computer program from the memory and run the computer program, so that the network node performs the method in any one of the second aspect or the possible implementations of the second aspect.

In a design, the network node is a communications chip, the receiving unit may be an input circuit or interface of the communications chip, and the sending unit may be an output circuit or interface of the communications chip.

According to a seventh aspect, a radio access network system is provided, including the network node in the third aspect or the fourth aspect, and the network node in the fifth aspect or the sixth aspect.

According to an eighth aspect, a computer program product is provided. The computer program product includes computer program code. When the computer program code is executed by a network node, the network node performs the method in any one of the first aspect or the possible implementations of the first aspect.

According to a ninth aspect, a computer program product is provided. The computer program product includes computer program code. When the computer program code is executed by a network node, the network node performs the method in any one of the second aspect or the possible implementations of the second aspect.

According to a tenth aspect, a computer readable medium is provided. The computer readable medium stores program code, and the program code includes an instruction used to perform the method in any one of the first aspect or the possible implementations of the first aspect.

According to an eleventh aspect, a computer readable medium is provided. The computer readable medium stores program code. The program code includes an instruction used to perform the method in any one of the second aspect or the possible implementations of the second aspect.

In some possible implementations, at least the first protocol layer is deployed in the second network node, and at least the second protocol layer and the third protocol layer are deployed in the first network node. The first protocol layer may be at least used for radio resource management, the second protocol layer may be at least used to control and manage data transmission in a medium, and the third protocol layer may be at least used to provide a physical resource for data transmission.

In some possible implementations, an RRC layer and a PDCP layer are deployed in the second network node, and an RLC layer, a MAC layer, and a PRY layer are deployed in the first network node.

It should be understood that, the foregoing illustrated protocol layers that are deployed for the first network node and the second network node are used for example description, and shall not constitute any limitation on this application. This application does not exclude a possibility of defining another protocol layer in a future protocol to replace a protocol layer in an existing protocol (for example, an LTE protocol) to implement a same or similar function.

It should be understood that, a protocol stack structure illustrated above for the first network node and the second network node is merely used for example description, and shall not constitute any limitation on this application. This application does not exclude a possibility of defining another protocol layer in a future protocol to replace a protocol layer in an existing protocol (for example, an LTE protocol) to implement a same or similar function. In addition, this application does not exclude a possibility of defining more or fewer protocol layers in a future protocol to replace a protocol layer in an existing protocol, either.

In some possible implementations, the measurement report includes at least one of the following:

a reference signal received power (RSRP), a reference signal received quality (RSRQ), a signal-to-noise ratio (SNR), a signal to interference plus noise ratio (SINR), channel state information (CSI), a channel quality indicator (CQI), a precoding matrix indicator (PMI), and a rank indication (RI).

Optionally, the measurement report may be cell (cell)-based or beam (beam)-based.

In some possible implementations, the second configuration information indicates a candidate secondary cell set.

By way of example and not limitation, the second configuration information includes at least one of the following:

terminal-device identity information, primary-cell identity information, secondary-cell identity information, a secondary-cell index, and secondary-cell frequency information.

By way of example and not limitation, the terminal-device identity information includes a C-RNTI or a UE ID; the primary-cell identity information includes a radio access network cell global identity or a physical cell identifier (PCI); and the secondary-cell identity information includes at least one of a radio access network cell global identity or a PCI.

In some possible implementations, the second configuration information further includes protocol-stack-related configuration information.

In some possible implementations, the first configuration information indicates the candidate secondary cell set.

By way of example and not limitation, the first configuration information includes at least one of the following: the secondary-cell identity information, the secondary-cell index, and the secondary-cell frequency information. The secondary-cell identity information includes at least one of a radio access network cell global identity or a PCI.

According to this application, the second network node generates the first configuration information at the first protocol layer, and the first network node sends the first configuration information including the serving cell set to the terminal device; and the first network node sends the first indication information at the second protocol layer to notify the terminal device of the at least one first secondary cell that is set to the active/inactive state, so that carrier aggregation is configured for the terminal device. Therefore, carrier aggregation can be implemented for the terminal device in a new network architecture, and this helps provide the terminal device with a larger transmission bandwidth.

DESCRIPTION OF EMBODIMENTS

The following describes the technical solutions of this application with reference to the accompanying drawings.

Figure 1:
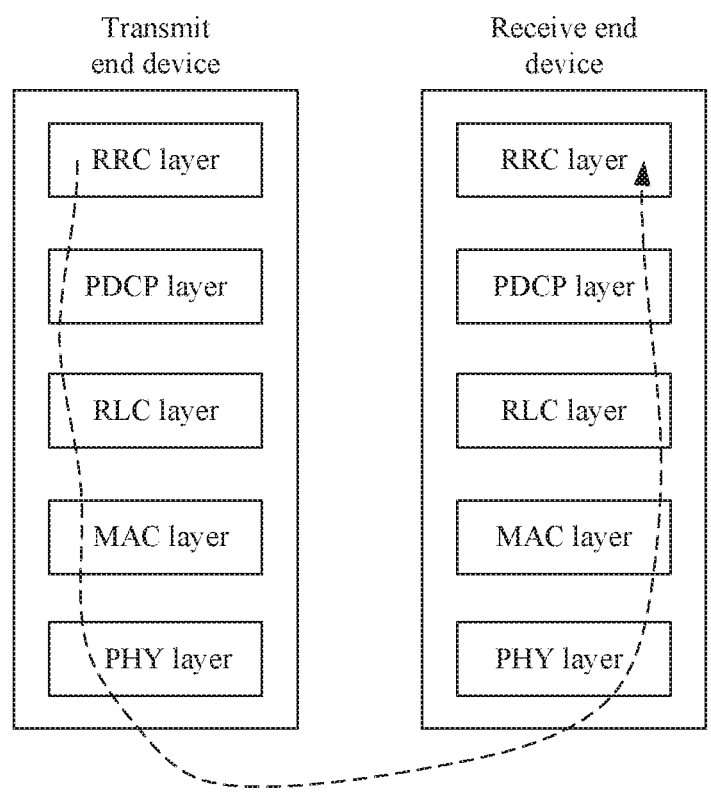
FIG. 1 is a schematic diagram of a protocol stack structure in LTE.

For ease of understanding of this application, a protocol stack structure in LTE is first described briefly with reference to FIG. 1. FIG. 1 is a schematic diagram of a protocol stack structure in LTE system. As shown in the figure, the current protocol stack structure in the LTE may include five protocol layers: an RRC layer, a PDCP layer, an RLC layer, a MAC layer, and a PHY layer from top to bottom. Signaling generated at any layer (for example, denoted as a protocol layer A, and it can be understood that, the protocol layer A may be any one of: the RRC layer, the PDCP layer, the RLC layer, the MAC layer, and the PHY layer) of a transmit end device needs to be processed by a lower protocol layer, and is finally sent to a receive end device through a physical channel. As shown by a curved line in the figure, correspondingly, signaling received by the receive end device through the physical channel also needs to the processed by the PHY layer and protocol layers above the PHY layer, and information in the signaling can be obtained by the receive end only after the signaling reaches the protocol layer A.

However, protocol layer division in a 5G network is still under discussion, and the protocol stack shown in FIG. 1 may be optimized. For example, a plurality of protocol layers are combined, or a new protocol layer is added. In addition, functions of a base station in an original access network are split. Therefore, an existing carrier aggregation configuration method may not be continuously used to configure a secondary cell for a terminal device.

In view of this, this application provides a communication method, to configure carrier aggregation for a terminal device based on a new network architecture in 5G.

Figure 2:
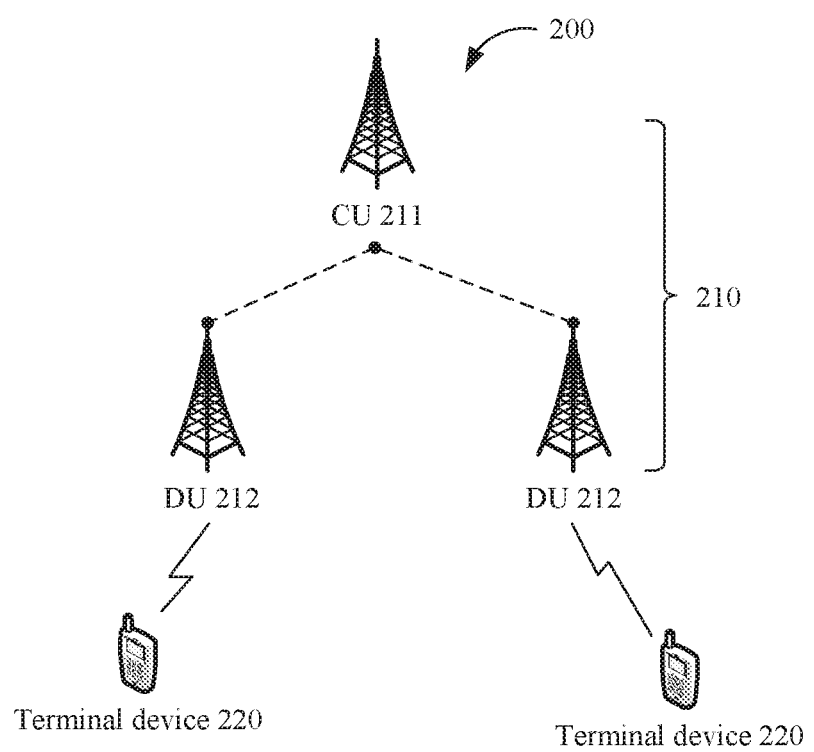
FIG. 2 is a schematic diagram of a communications system applicable to a communication method in an embodiment of this application.

For ease of understanding of the communication method of this application, the following describes, in detail with reference to FIG. 2, a communications system applicable to the communication method in this embodiment of this application. FIG. 2 is a schematic diagram of a communications system 200 applicable to the communication method in this embodiment of this application.

As shown in FIG. 2, the communications system 200 includes an access network system 210 and terminal devices 220. In a 5G system, a CU-DU architecture may be used for the access network system 210. Specifically, the access network system 210 may include at least one CU 211 and at least one DU 212, and the at least one DU 212 may be connected to one CU 211. A communications interface (may be denoted as a first communications interface for ease of differentiation and description) is configured between the CU 211 and the DU 212. The CU 211 may communicate with the DU 212 through the first communications interface. The DU 212 may communicate with the terminal device 220 through an air interface.

CUs may be deployed in a centralized manner, and depending on an actual network environment, may be deployed in an urban core area with relatively high traffic density, a relatively small inter-site distance, and limited equipment room resources, for example, in a university campus and a large performance venue. DUs may also be deployed in a centralized manner. However, in an area with relatively low traffic density and a relatively large inter-site distance, for example, in a suburban county and a mountainous area, DUs may be deployed in a distributed manner. This is not specifically limited in this application.

Functions of the access network system 210 in FIG. 2 may be similar to those of a base station in LTE system. Specifically, some functions of the base station in LTE system may be deployed in the CU 211, and remaining functions may be deployed in the DU 212. However, functions of the CU 211 and the DU 212 are not limited to the functions of the base station in LTE system. With evolution of the 5G network, the functions of the base station may vary. For example, other network functions are added, or some existing functions are improved, or even some unnecessary functions may be removed. This is not specifically limited in this application.

It should be understood that, function division illustrated above for the CU and the DU is merely used for example description, and shall not constitute any limitation on this application. For example, alternatively, the CU may include some functions of an upper-layer protocol stack of a radio access network system and some functions of a core network, and the DU may include some functions of the PHY layer and the MAC layer.

It should be further understood that FIG. 2 is merely a simplified schematic diagram and used as an example for ease of understanding. The communications system 200 may further include other network devices and/or terminal devices that are not drawn in FIG. 2. Referring to the protocol stack structure shown in FIG. 1 again, the CU may be configured to take charge of centralized management and control on radio resources and connections, or more specifically, configured to process functions of a radio upper-layer protocol stack, such as the RRC layer or the PDCP layer. The DU may be mainly configured to process a PHY layer function and a function with a relatively high real-time requirement, or more specifically, configured to process functions of a lower-layer protocol stack, such as the RLC layer the MAC layer, and the PRY layer.

With reference to the protocol stack structure in FIG. 1, the protocol layers may be split.

Figure 3A:
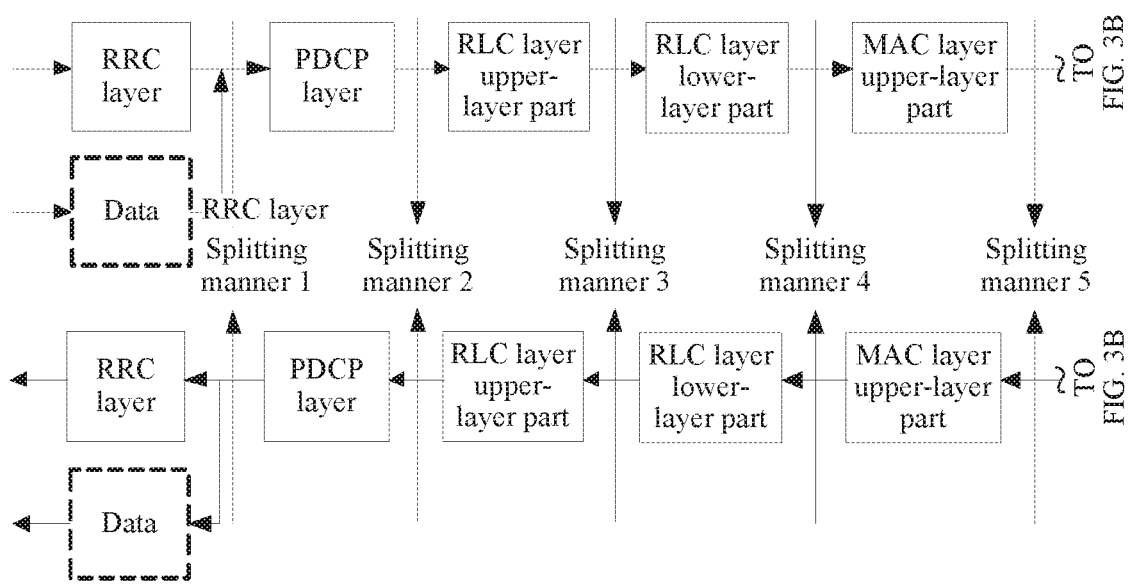
FIG. 3A and FIG. 3B are a schematic diagram of splitting a protocol stack structure.
Figure 3B:
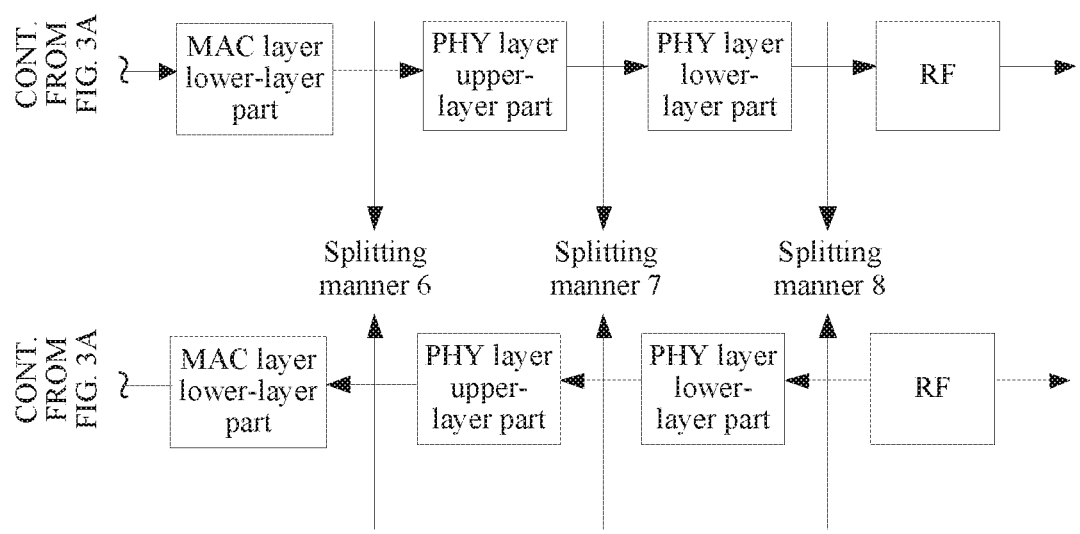

FIG. 3A and FIG. 3B are a schematic diagram of splitting a protocol stack structure. As shown in FIG. 3A and FIG. 3B, protocol layers of the CU-DU architecture may include: an RRC layer, a PDCP layer, a upper-layer part of RLC layer, a lower-layer part of RLC layer, a upper-layer part of MAC layer, a lower-layer part, of MAC layer, a upper-layer part of PHY layer, and a lower-layer part of PHY layer. An RLC layer, a MAC layer, and a PRY layer are separately split. A function with a low real-time requirement at a protocol layer is placed in an upper-layer part of the protocol layer, and a function with a high real-time requirement at the protocol layer is placed in a lower-layer part of the protocol layer. CU-DU functions may be split in a plurality of manners. For example, the following seven splitting manners may be included.

Splitting manner 1: Splitting is performed between the RRC layer and the PDCP layer. To be specific, the RRC layer is deployed in the CU, and the PDCP layer and protocol layers below the PDCP layer are deployed in the DU.

Splitting manner 2: Splitting is performed between the PDCP layer and the RLC layer. To be specific, the RRC layer and the PDCP layer are deployed in the CU, and the upper-layer part of RLC player and protocol layers below the upper-layer part of RLC player are deployed in the DU.

Splitting manner 3: The RLC layer is divided into two parts. A function with a low real-time requirement is placed in the RLC layer upper-layer part, and a function with a high real-time requirement is placed in the RLC layer lower-layer part. Splitting is performed between the RLC layer upper-layer part and the RLC layer lower-layer part. To be specific, the RLC layer upper-layer part and protocol layers above the RLC layer are deployed in the CU, and the RLC layer lower-layer part and protocol layers below the RLC layer are deployed in the DU.

Splitting manner 4: Splitting is performed between the RLC layer and the MAC layer. To be specific, the RLC layer and protocol layers above the RLC layer are deployed in the CU, and the MAC layer and protocol layers below the MAC layer are deployed in the DU.

Splitting manner 5: The MAC layer is divided into two parts. A function with a low real-time requirement is placed in the MAC layer upper-layer part, and a function with a high real-time requirement is placed in the MAC layer lower-layer part. Splitting is performed between the MAC layer upper-layer part and the MAC layer lower-layer part. To be specific, the MAC layer upper-layer part and protocol layers above the MAC layer are deployed in the CU, and the MAC layer lower-layer part and protocol layers below the MAC layer are deployed in the DU.

Splitting manner 6: Splitting is performed between the MAC layer and the PHY layer. To be specific, the MAC layer and protocol layers above the MAC layer are deployed in the CU, and the PHY layer and an RF are deployed in the DU.

Splitting manner 7: The PHY layer is divided into two parts. A function with a low real-time requirement is placed in the PHY layer upper-layer part, and a function with a high real-time requirement is placed in the PHY layer lower-layer part. Splitting is performed between the PHY layer upper-layer part and the PHY layer lower-layer part. To be specific, the upper-layer part of PHY layer and protocol layers above the PHY layer are deployed in the CU, and the lower-layer part of PHY layer, and the RF are deployed in the DU.

In addition, splitting may be performed between the radio frequency (Radio Frequency, RF) and the foregoing protocol layers, namely, an eighth splitting manner may be further included, and splitting is performed between the PHY layer lower-layer part and the RE. To be specific, the PHY layer and protocol layers above the PRY layer are deployed in the CU, and the RF is deployed in the DU. In other words, only a transmit antenna is deployed in the DU, and all the protocol layers are deployed in the CU.

Figure 4:
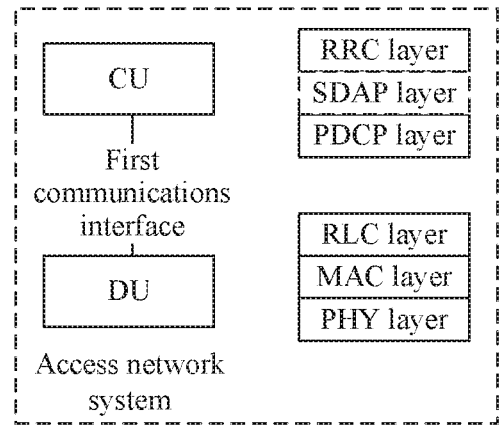
FIG. 4 is a schematic diagram of a possible protocol stack structure of a network device according to this application.

FIG. 4 is a schematic diagram of a possible protocol stack structure of a network device according to this application. As shown in FIG. 4, the possible protocol stack structure is as follows: An RRC layer and a PDCP layer are deployed in a CU, and an RLC layer, a MAC layer, and a PHY layer are deployed in a DU. In addition, a new protocol layer may be introduced to a future mobile communications system to perform a new function, for example, a function such as QoS management or user data convergence and identification. An SDAP (Service Data Adaptation Protocol, service data adaptation protocol) layer is used as an example, and the new protocol layer may be deployed above the PDCP layer, and deployed in the CU. It should be noted that, in the protocol stack structure, a new protocol layer may be alternatively deployed in the DU. For example, a new protocol layer is deployed above the RLC layer, or a new protocol layer is deployed between the RLC layer and the MAC layer. This is not specifically limited in this application. The new protocol layer may be a user plane protocol layer used to process only data. Alternatively, the new protocol layer may be a control plane protocol layer used to process signaling, for example, an RRC message. Alternatively, the new protocol layer is used for both a control plane and a data plane, and used to process signaling and data. This is not specifically limited in this application.

Processing an uplink or downlink RRC message or data by the CU and the DU is described separately by using the protocol stack structure shown in FIG. 4 as an example.

For the downlink RRC message or data, the CU generates the RRC message or data, and processes the RRC message or data at the PDCP layer, to obtain a PDCP protocol data unit (PDU) (namely, an RLC service data unit (SDU)). The CU transmits the PDCP PDU to the DU through a communications interface (for example, an F1 communications interface, namely, an example of a first communications interface) between the CU and the DU. The DU further processes the PDCP PDU at the RLC layer, the MAC layer, and the PHY layer, and finally sends a processed PDCP PDU to a radio channel through the RF for transmission.

For the uplink RRC message or data, the DU receives a data packet by using a radio frequency apparatus, processes the data packet successively at the PHY layer, the MAC layer, and the RLC layer, and then transmits an RLC SDU (namely, a PDCP PDU) to the CU through an F1 interface between the CU and the DU. The CU further processes the RLC SDU at the PDCP layer to obtain the RRC message or data, and sends the RRC message or data to the RRC layer (for the RRC message) or an application layer (for the data).

It should be noted that the H communications interface includes a control plane (CP) and a user plane (UP). A transport layer protocol of the control plane may be a stream control transmission protocol (SCTP). A transport layer protocol of the user plane is a CPRS (general packet radio service) tunneling protocol for the user plane (GTP-U). A signaling protocol of an upper layer (namely, the application layer) of a transport layer may be an F1 application protocol (F1AP).

In the embodiments in the following description, for ease of description, the embodiments of this application are described in detail with reference to an example of a CU-DU protocol stack structure in FIG. 4. However, it should be understood that, the protocol stack structure is merely used for example description, and shall not constitute any limitation on this application.

It should be further understood that, the CU and DU function division and the protocol layer structure illustrated in the foregoing description with reference to FIG. 3A, FIG. 3B, and FIG. 4 are merely used for example description, and shall not constitute any limitation on this application. With evolution of communications technologies, protocol layer functions of the network device, naming manners of the network device, message content, and message names may be different from those defined in an LTE protocol. For example, a reordering function of the RLC layer in LTE system may be moved up to the PDCP layer. For another example, the RRC message in LTE system may be replaced with another name. This application imposes no limitation on protocol layers deployed in the CU and the DU, protocol layer functions, protocol layer names, or protocol layer message names.

It should be further understood that, the CU-DU architecture is merely used as a possible example of the new 5G network architecture in this application, and the technical solutions of this application are also applicable to a radio access network system with another network architecture. The radio access network system includes a first network node and a second network node. The first network node has at least a first protocol layer. The second network node has at least a second protocol layer, but no first protocol layer. The first protocol layer may be, for example, the RRC layer, some functions of the RRC layer, the PDCP layer, some functions of the PDCP layer, the SDAP layer, some functions of the SDAP layer, the RLC layer, some functions of the RLC layer, an adaptive layer (for example, a protocol layer having a QoS management function or a user data convergence and identification function), or some functions of the adaptive layer. The second protocol layer may be, for example, a physical layer, some functions of the physical layer, the MAC layer, some functions of the MAC layer, the RLC layer, some functions of the RLC layer, the adaptive layer, or some functions of the adaptive layer. It should be further understood that the F1 interface is only an example of the first communications interface. The first communications interface may be a wired interface or may be a wireless interface, for example, a wireless transmission interface between a host base station and a relay station or between two relay stations.

It should be further understood that, the technical solutions of this application may be applied to all kinds of communications systems, for example, a global system for mobile communications (GSM) system, a code division multiple access (CDMA) system, a wideband code division multiple access (WCDMA) system, a general packet radio service (CPRS) system, a long term evolution (LTE) system, a long term evolution advanced (LTE-A) system, a universal mobile telecommunication system (UMTS), or a next generation communications system (for example, a 5G system). The 5G system may also be referred to as a new radio access technology (NR) system.

In addition, the communication method in the embodiments of this application is described in this application with reference to a radio access network system and a terminal device.

The radio access network system (namely, a node (Node)) may include a device communicating with a wireless terminal through an air interface on an access network by using one or more sectors. The radio access network system may be configured to perform conversion between a received over-the-air frame and an internet protocol (Internet Protocol, IP) packet, and serve as a router between the terminal device and a rest part of the access network. The rest part of the access network may include an IP network. The radio access network system may further coordinate attribute management for the air interface.

It should be understood that the radio access network system in this application may include a base transceiver station (BTS) in a GSM system or a CDMA system, a NodeB (NodeB) in a WCDMA system, or an evolved NodeB (evolved Node B, eNodeB, eNB, or e-NodeB) in an LTE system; or may include a relay station, an access point, a remote radio unit (RRU), an in-vehicle device, a wearable device, and a radio access network (RAN) device in a 5G system and a future radio communications system, for example, a base station, a gNB, an NR Node, an NR BS, a new RAN node, or a new RAN BS; or may be a transmission point (TP), a transmission reception point (TRP), a relay station, or the like. This is not specifically limited in this application.

It should be understood that the terminal device in this application may be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a station (ST) in a wireless local area network (WLAN), may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, an in-vehicle device, a wearable device, a terminal device in a next generation communications system such as a 5G network, or a terminal device in a future evolved public land mobile network (PLMN). This is not specifically limited in the embodiments of the present invention.

The foregoing describes, in detail with reference to the accompanying drawings, the architecture of the communications system applicable to the communication method in the embodiments of this application. The following describes, in detail with reference to the accompanying drawings, the communication methods in the embodiments of the present invention.

Figure 5:
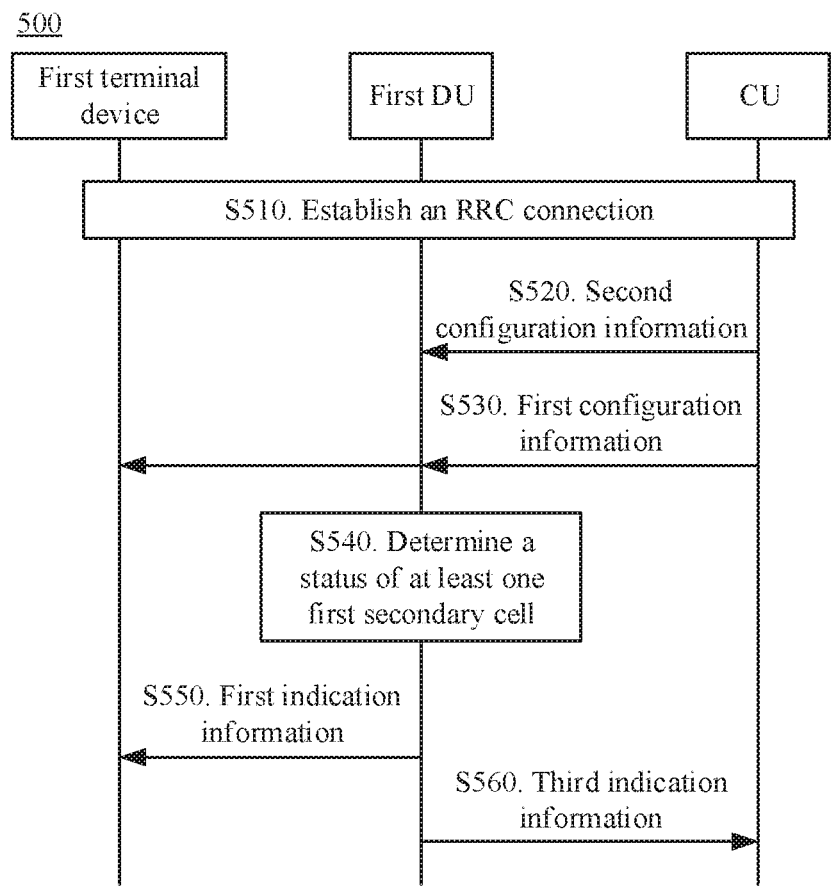
FIG. 5 is a schematic flowchart of a communication method according to an embodiment of this application.
Figure 6:
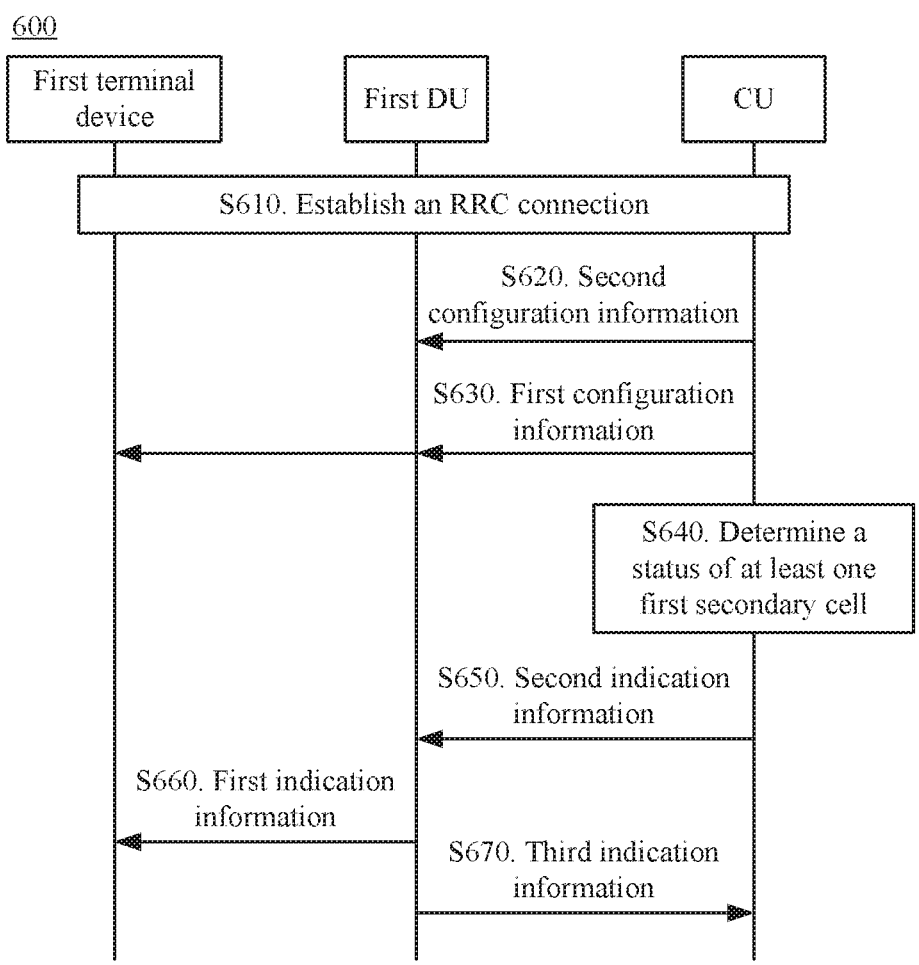
FIG. 6 is a schematic flowchart of a communication method according to another embodiment of this application.
Figure 7:
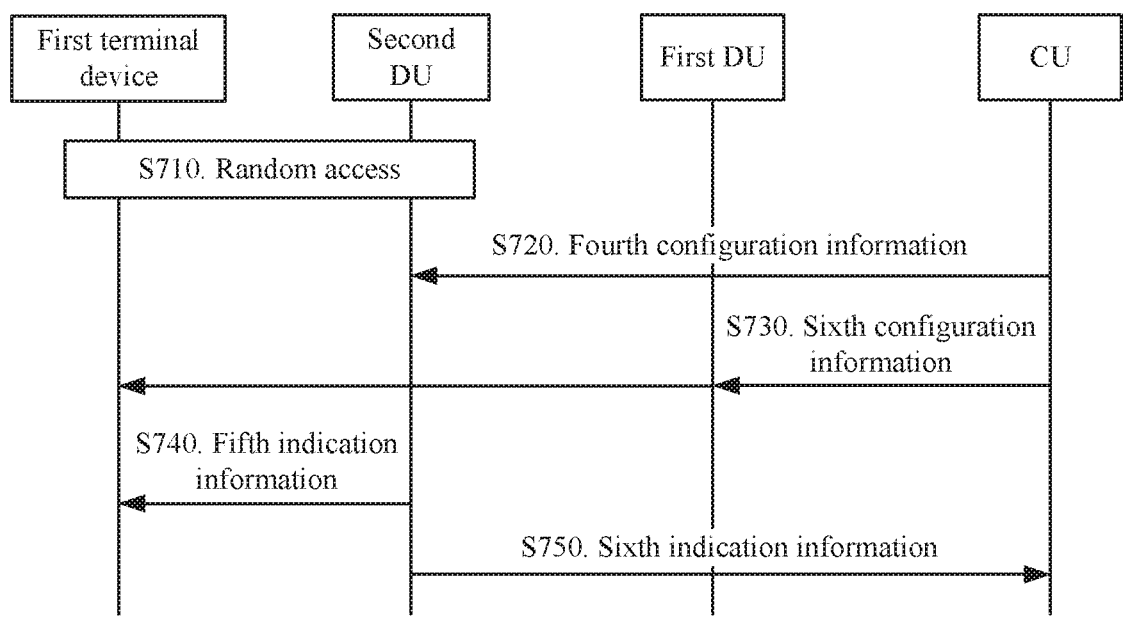
FIG. 7 is a schematic flowchart of a communication method according to still another embodiment of this application.

FIG. 5 to FIG. 7 each are a schematic flowchart of a communication method in an embodiment of this application from the perspective of device interaction. It should be understood that the method may be applied to a radio communications system. Simply for ease of understanding, the following describes the embodiments of the present invention in detail by using the communications system of the CU-DU architecture shown in FIG. 2. The communications system may include one second network node (for example, a CU), at least one first network node (for example, including a first DU, a second DU, and a third DU illustrated in the following description), and at least one terminal device (for example, including a first terminal device shown in the following description). The first network node may communicate with the second network node through a first communications interface, and the first network node may communicate with the terminal device through an air interface. For example, the communications system may be the communications system 200 shown in FIG. 2, the first network node and the second network node may be respectively corresponding to the DU 212 and the CU 211 shown in FIG. 2, and the terminal device may be corresponding to the terminal device 220 shown in FIG. 2.

In the following embodiments to be described, without loss of generality, a specific process of configuring carrier aggregation for the first terminal device in the CU-DU architecture is described in detail by using the first terminal device (namely, an example of the terminal device) in the communications system as an example. The first terminal device may be any one of the at least one terminal device in the communications system 200 shown in FIG. 2, and a DU in a primary cell (PCell) connected to the first terminal device is the first DU (namely, an example of the DU). To provide the first terminal device with a larger transmission bandwidth, the CU and the first DU configure one or more secondary cells (secondary cell, SCell) for the first terminal device, that is, configure carrier aggregation for the first terminal device.

It should be understood that, carrier aggregation is specific to the terminal device, different component carriers (CC) may be configured for different terminal devices, and each component carrier may be corresponding to an independent cell. For example, a primary cell is corresponding to a primary component carrier (or referred to as a primary carrier), a secondary cell is corresponding to a secondary component carrier (or referred to as a secondary carrier), and the primary cell and the secondary cell constitute a serving cell set of the terminal device. In other words, the serving cell set includes at least one primary cell and at least one secondary cell.

In this application, for ease of understanding, definitions in LTE can still be used. When carrier aggregation is configured for the terminal device, the terminal device has only one RRC connection to a network. During RRC connection establishment/reestablishment or a handover, a serving cell that provides non-access stratum (NAS) mobile information (for example, a tracking area identifier) is a primary cell. During RRC connection reestablishment or the handover, a serving cell that provides security input is a primary cell. The primary cell communicates with the terminal device by using an RRC message, to provide a security-related parameter and configure a physical uplink control channel (PUCCH) resource. The secondary cell may be added during RRC connection reconfiguration, and is a cell used to provide an extra radio resource. Therefore, the primary cell may be determined during connection establishment, or may be designated by a target base station by using a handover command during the handover, and the secondary cell is added, modified, or deleted by using an RRC connection reconfiguration message after an initial security activation process. In this scenario, the DU (denoted as the first DU for ease of differentiation and description) in the primary cell and the CU may configure carrier aggregation for the first terminal device. The following describes, in detail with reference to FIG. 5 and FIG. 6, a specific process of configuring carrier aggregation for the first terminal device in this scenario.

In another possible scenario, the terminal device communicates with a plurality of base station systems by using a dual connectivity (DC) or multi-connectivity technology. After initial access or a handover, the terminal device establishes an RRC connection to the first DU, and determines a cell managed by the first DU as a primary cell. Then, the CU or the first DU may further add another DU (denoted as the second DU for ease of differentiation and description) for the terminal device as a secondary base station, and use a cell managed by the second DU as a primary secondary cell, and one or more other cells managed by the second DU as secondary cells. In this scenario, the CU, the DU (namely, the first DU) in the primary cell, and the DU (namely, the second DU) in the primary secondary cell may configure carrier aggregation for the first terminal device together. The following describes, in detail with reference to FIG. 7, a specific process of configuring carrier aggregation for the first terminal device in this scenario.

However, it should be understood that the foregoing definitions of the primary cell, the secondary cell, and the primary secondary cell are merely used for example description. This application does not exclude a possibility of modifying the definitions of the primary cell, the secondary cell, and the primary secondary cell in a future protocol. In addition, this application neither excludes a possibility of defining a new protocol layer in a future protocol to replace an RRC layer, to implement a function same as or similar to that of the RRC layer in LTE.

It should be further noted that, because carrier aggregation is specific to the terminal device, a primary cell of one terminal device (for example, denoted as a terminal device #A) may be a secondary cell of another terminal device (for example, denoted as a terminal device #B), and a secondary cell of the terminal device #A may be a primary cell of still another terminal device (for example, denoted as a terminal device #C). In other words, the primary cell and the secondary cell are for a specific terminal device.

In addition, a protocol stack structure deployed in the CU and the DU (including the first DU and the second DU) shown in FIG. 5 to FIG. 7 may be, for example, the protocol stack structure shown in FIG. 4. At least a first protocol layer is deployed in the CU. The first protocol layer may be at least used to implement a function of radio resource management. For example, the first protocol layer is an RRC layer. At least a second protocol layer is deployed in the DU. The second protocol layer may be at least used to implement a function of controlling and managing data transmission on a medium. For example, the second protocol layer is a MAC layer. Other protocol layers, such as an RLC layer and a PDCP layer from bottom to top, may be further configured between the first protocol layer and the second protocol layer. Each protocol layer may have a function same as that of a protocol layer defined in a current protocol (for example, the LTE protocol), or functions of the protocol layers in the current protocol may be modified. For example, in this embodiment of this application, the RRC layer deployed in the CU may implement RRC functions of the RRC layer in the current protocol, for example, those other than that of a signaling radio bearer (signal radio bearer, SRB) 0, and an RRC function corresponding to the SRB 0 may be deployed in the DU.

It should be understood that, simply for ease of description, the embodiments of this application are described by using the protocol stack structure shown in FIG. 4 as an example, and the protocol stack structure deployed in the CU and the DU is not limited thereto. More illustration and description have been provided for the protocol stack structure deployed in the CU and the DU in the foregoing description. Details are not described herein again for brevity.

The following first describes, in detail with reference to FIG. 5, a communication method 500 provided in an embodiment of this application.

As shown in FIG. 5, the method 500 includes the following steps.

S510. A first terminal device establishes an RRC connection to a first cell in a first DU.

The first terminal device is synchronized with a cell (denoted as the first cell for ease of differentiation and description) through cell searching, obtains system information of the first cell, and then may initiate an initial access process. Alternatively, the first terminal device accesses the first cell in an RRC connection reestablishment process or a handover process. It can be understood that the first cell is a primary cell of the first terminal device (it should be understood that, a carrier corresponding to the primary cell is a primary carrier) The system information of the first cell obtained by the terminal device is system information of the primary cell, and the terminal device sends a random access request and an RRC connection request to the DU (denoted as the first DU for ease of differentiation and description) of the first cell, to request to access the first cell.

After establishing the RRC connection to the first cell, the first terminal device may obtain identities separately allocated by the first DU, the CU, and a core network device to the terminal device. By way of example and not limitation, the first DU allocates a cell radio network temporary identity (C-RNTI) to the first terminal device, the CU may allocate a user equipment (UE) identity (ID) on a first communications interface to the first terminal device, and the core network device may allocate a temporary mobile subscriber identity (TMSI) to the first terminal device. In other words, each terminal device has different identities in different network devices, but all the identities of each terminal device in different network devices can uniquely indicate the terminal device. There is a one-to-one mapping relationship between identities allocated by network devices to one terminal device, and each network device may store the mapping relationship, so that the other network devices determine the terminal device based on any identity of the terminal device.

It should be understood that, a specific process of initially accessing a network by the terminal device may be similar to an access process in an existing protocol (for example, an LTE protocol). For brevity, detailed description of the specific process is omitted herein.

For the initial access process, after establishing the RRC connection to the first cell, the first terminal device may complete registration and authentication on a core network, and activate security of the core network and an air interface.

S520. The CU configures a first serving cell set for the first terminal device, and sends configuration information (denoted as second configuration information for ease of differentiation and description) of the first serving cell set to the first DU.

Specifically, after the first terminal device establishes the RRC connection to the first cell n the first DU, the CU may configure the first serving cell set for the first terminal device.

It can be learned from the foregoing description that, without considering dual connectivity or multi-connectivity, carrier aggregation may be intra-site carrier aggregation and cross-site carrier aggregation. If carrier aggregation is intra-site carrier aggregation, the first serving cell set may include cells that are in cells managed by the first DU and that may be configured as secondary cells of the first terminal device; or if carrier aggregation is cross-site (or referred to as inter-site) carrier aggregation, the first serving cell set may include cells that are in cells managed by the first DU and another DU (for example, a third DU) and that may be configured as secondary cells of the first terminal device.

It should be understood that, simply for ease of differentiation and description, it is assumed herein that DUs corresponding to the secondary cells in the first serving cell set include the first DU and the third DU. Actually, there may be more DUs corresponding to the secondary cells in the first serving cell set. This is not specifically limited in this application.

In this embodiment of this application, the CU may configure the first serving cell set for the first terminal device by using at least one of the following methods:

Method 1: The CU configures the first serving cell set for the first terminal device based on a measurement result.

Method 2: The CU blindly configures the first serving cell set of the first terminal device.

Specifically, in Method 1, the measurement result may include at least one of the following:

a first measurement result of a first protocol layer from the first terminal device;

a second measurement result of a third protocol layer from the first terminal device; and a third measurement result of an uplink channel that is reported by the first DU and that is obtained through measurement based on a signal of the first terminal device.

The first protocol layer is a protocol layer above the second protocol layer. In this embodiment of this application, by way of example and not limitation, the first protocol layer may be an RRC layer or a protocol layer that has a similar radio resource management function. The third protocol layer may be a PRY layer or a protocol layer that has a similar function of providing a physical resource for data transmission.

In the measurement results illustrated above, the first measurement result and the second measurement result are measurement results of a downlink channel, and the measurement results may be measurement reports generated by the first terminal device, or may be measurement results obtained through processing by the first DU. Specifically, the measurement results of the downlink channel include an RRC layer measurement result (or referred to as a radio resource management (radio resource management, RRM) measurement result, or a layer 3 measurement result) and a PRY layer measurement result (or referred to as a layer 1 measurement result).

It can be understood that, when an RRC layer and a PDCP layer are deployed in the CU, and an RLC layer, a MAC layer, and a PHY layer are deployed in the DLI, the CU may obtain the measurement results of different protocol layers from the first terminal device in different manners.

For an RRC layer measurement report from the first terminal device, the RRC layer measurement report may be carried in an RRC message, and therefore the RRC layer measurement report may be directly forwarded to the CU by the first DU, and the CU can parse out the first measurement result at the RRC layer based on the measurement report.

For a PHY layer measurement report from the first terminal device, the PHY layer measurement report may be carried in a PHY layer message or a MAC layer message, and therefore the first DU can parse out the second measurement result when receiving the PHY layer measurement report. Then, the first DU sends the second measurement result to the CU through the first communications interface.

It should be noted herein that, if the measurement result based on which the CU configures the first serving cell set for the first terminal device includes the second measurement result of the third protocol layer from the first terminal device, a measurement signal (for example, a downlink reference signal) needs to be configured to be transmitted on carriers corresponding to secondary cells in the first serving cell set. In this way, UE receives the measurement signal, to accurately obtain second measurement results of the third protocol layer that are obtained through measurement by the first terminal device for the secondary cells in the first serving cell set.

By way of example and not limitation, the measurement report from the first terminal device may include at least one of the following:

a reference signal received power (RSRP), a reference signal received quality (RSRQ), a signal-to-noise ratio (SNR), a signal to interference plus noise ratio (SINR), channel state information (CSI), a channel quality indicator (CQI), a precoding matrix indicator (PMI), and a rank indication (RI).

The measurement report illustrated above may be based on a cell or beam. If the measurement report is based on a cell, the measurement report carries a cell identity (cell ID), or if the measurement report is based on a beam, the measurement report carries a beam identifier (beam ID).

The third measurement result is a measurement result of the uplink channel. The measurement result of the uplink channel may be obtained by the first DU by monitoring the uplink channel. Specifically, a measurement report may be generated based on a sounding reference signal (SRS) or a channel state information-reference signal (CSI-RS) sent by the first terminal device, and is sent to the CU through the first communications interface.

It should be noted that, the measurement result sent by the first DU to the CU through the first communications interface may be carried in an F1 interface control plane message or an F1 interface user plane message.

By way of example and not limitation, the measurement report of the uplink channel may include at least one of the following:

an RSRP, an RSRQ, an SNR, an SINR, CSI, a CQI, a PMI, and an RI.

It should be understood that specific content of the measurement report illustrated above is merely used for example description, and shall not constitute any limitation on this application. The measurement report may include one or more pieces of the content, or may include content other than the content illustrated above. This is not specifically limited in this application.

In Method 2, the CU may determine the first serving cell set for the first terminal device by using a blind configuration method. For the method, refer to a specific process in the prior art in which a base station blindly configures a first serving cell set for a first terminal device. For brevity, detailed description of the specific process is omitted herein.

It should be understood that, the CU may alternatively determine the first serving cell set for the first terminal device based on other information, for example, based on history information reported by the first terminal device. This is not specifically limited in this application.

Optionally, the second configuration information may be generated by the CU based on a protocol supported by a first communications interface (for example, an CU interface). For example, the second configuration information may be carried in an F1 interface control plane (denoted as an F1CP) message, and further, the F1 interface control plane message is an F1AP message. Alternatively, the second configuration information may be carried in an F1 interface user plane (denoted as an F1UP) message. Optionally, the F1 interface control plane message is carried in a transport layer protocol of SCTP, and the F1 interface user plane message is carried in a transport layer protocol of GTP-U.

The first DU may receive the second configuration information through the first communications interface. For example, the first DU obtains the second configuration information based on an F1AP.

The second configuration information includes at least one of the following:

terminal-device identity information, primary-cell identity information, secondary-cell identity information, a secondary-cell index, and secondary-cell frequency information.

By way of example and not limitation, the terminal-device identity information includes at least one of a C-RNTI and a UE ID.

By way of example and not limitation, the primary-cell identity information includes at least one of a radio access network cell global identity and a physical cell identifier (physical cell identifier, PCI).

By way of example and not limitation, the secondary-cell identity information includes at least one of a radio access network cell global identity and a PCI.

Optionally, the second configuration information further indicates a status of a secondary cell.

The status of the secondary cell is an active state or an inactive state.

Specifically, the second configuration information may include an identity of each secondary cell and a status of the secondary cell, that is, the status of each secondary cell is indicated in an explicit manner. Alternatively, it may be defined in a protocol that the second configuration information includes only a secondary cell in the active state or a secondary cell in the inactive state. Correspondingly, the second configuration information may include only the secondary cell in the active state or the secondary cell in the inactive state, that is, the status of each secondary cell is indicated in an implicit manner.

In this embodiment of this application, the second configuration information may be used to indicate the first serving cell set configured by the CU for the first terminal device, and the first serving cell set includes at least one secondary cell. Optionally, the second configuration information may include a secondary cell (Scell) list (Scell list), and a one-to-one mapping relationship between secondary-cell identity information, a secondary-cell index, and secondary-cell frequency information is recorded in the secondary cell list.

Optionally, the second configuration information may further include protocol-stack-related configuration information.

By way of example and not limitation, protocol-stack-related configuration information may include: RLC layer configuration-related information such as buffer (buffer) configuration-related information; MAC layer configuration-related information, for example, including configuration-related information of a hybrid automatic repeat request (HARQ) entity and configuration-related information of a buffer stale report (BSR) size (BSR-Size); and PHY layer configuration-related information, for example, indicating whether cross-carrier scheduling can be configured, and cross-carrier scheduling configuration-related information.

It should be understood that the foregoing illustration is merely used for example description, and shall not constitute any limitation on this application. For the protocol-stack-related configuration information, refer to prior-art information used for protocol stack configuration. For brevity, examples are not provided herein one by one.

It should be noted that, in the case of inter-site carrier aggregation, a secondary cell configured by the CU for the first terminal device may not belong to the first DU. In this case, the CU may simultaneously send the second configuration information to a DU (for example, the third DU) of the secondary cell, so that all DUs obtain information about secondary cells in the first serving cell set.

Optionally, the first DU and the third DU perform protocol-layer-related configuration for the secondary cells in the first serving cell set based on the second configuration information.

Specific content of the protocol-stack-related configuration information included in the second configuration information has been illustrated in the foregoing description. After receiving the second configuration information, each DU can perform configuration based on the protocol-stack-related configuration information included in the second configuration information. Specifically, each protocol layer (for example, including the RLC the MAC layer, and the PHY layer) may update a configuration parameter or establish a corresponding entity for a component carrier allocated to the first terminal device. For example, a larger buffer may be allocated at the RLC layer, a plurality of HARQ entities are allocated to each secondary cell at the MAC layer, and physical channel configuration information is allocated to each secondary cell at the PHY layer, for example, whether cross-carrier scheduling needs to be activated is determined. In a case of cross-carrier scheduling, physical resource scheduling information of another cell is carried on a PDCCH, so as to perform physical channel data transmission.

It should be understood that, a specific process and method in which each DU performs protocol-layer-related configuration for a corresponding secondary cell may be the same as a specific process and method in the prior art in which a base station performs protocol-layer-related configuration for each secondary cell. Details are not described herein for brevity.

Optionally, S520 may be alternatively as follows: The first DU configures a first serving cell set for the first terminal device, and sends configuration information (denoted as third configuration information for ease of differentiation and description) of the first serving cell set to the CU. Specifically, the first serving cell set may be configured for the first terminal device by using the following two methods:

Method 1: The first DU determines a secondary cell in a secondary cell list, and sends secondary-cell identity information to the CU, and the CU allocates a secondary-cell index to the corresponding secondary cell, and sends the secondary-cell index to the first DU.

Method 2: The first DU determines a secondary cell in a secondary cell list, allocates a corresponding secondary-cell index, and sends secondary-cell identity information and the secondary-cell index to the CU.

Specifically, corresponding to Method 1, the third configuration information may include at least the secondary-cell identity information. Optionally, the third configuration information may further include at least one of secondary-cell frequency information and secondary-cell status information. After receiving the third configuration information, the CU sends a first acknowledgment message to the DU, and the first acknowledgment message includes at least the secondary-cell index. Optionally, the first acknowledgment message may further include at least one of the following: the secondary-cell identity information, the secondary-cell frequency information, and the secondary-cell status information.

Specifically, corresponding to Method 2, the third configuration information may include at least: the secondary-cell identity information and the secondary-cell index. Optionally, the third configuration information may further include at least one of secondary-cell frequency information and secondary-cell status information. Further, optionally, after receiving the third configuration information, the CU sends a first acknowledgment message to the DU. Optionally, the first acknowledgment message may include at least one of the following: the secondary-cell identity information, the secondary-cell index, the secondary-cell frequency information, and the secondary-cell status information.

Optionally, in the foregoing two methods, the first acknowledgment message may further include protocol stack configuration information corresponding to the secondary cell. It should be understood that, a specific method in which the first DU performs protocol-layer-related configuration for each secondary cell in the first serving cell set based on the first acknowledgment message is similar to a specific method in which the first DU performs protocol-stack-related configuration for the secondary cell based on the second configuration information. To avoid repetition, specific description of the step is omitted herein.

Optionally, the third configuration information may be generated by the first DU based on a protocol supported by a first communications interface (for example, an F1 interface). For example, the third configuration information may be carried in an F1 interface control plane (denoted as an F1CP) message, and further, the F1 interface control plane message is an F1AP message. Alternatively, the third configuration information may be carried in an F1 interface user plane (denoted as an F1UP) message. Optionally, the F1 interface control plane message is carried in a transport layer protocol of SCTP, and the F1 interface user plane message is carried in a transport layer protocol of GTP-U.

The CU may receive the third configuration information through the first communications interface. For example, the CU obtains the third configuration information CU based on an F1AP.

It should be understood that, a method for generating and sending the first acknowledgment message is similar to a method for generating and sending the second configuration information. To avoid repetition, specific description of the step is omitted herein.

In addition, it should be noted that for ease of understanding, only a process in which the CU sends the second configuration information to the first DU is shown in the figure, and a process in which the first DU sends the third configuration information to the CU and a process in which the CU sends the first acknowledgment message to the first DU are not shown, but this shall not constitute any limitation on this application.

Optionally, the method 500 further includes the following step.

S530. The CU generates first configuration information, and the first DU forwards the first configuration information to the first terminal device.

Specifically, the CU may send configuration information (denoted as the first configuration information for ease of differentiation and description) of a candidate secondary cell list to the first terminal device. Specifically, the CU may generate the first configuration information at the first protocol layer. Using the protocol stack structure shown in FIG. 4 as an example, the first configuration information is information generated at the RRC layer, and the information is processed at the PDCP layer and then sent to the first DU through the first communications interface. The first DU processes the received information at the RLC layer, the MAC layer, and the PHY layer successively, and an RF sends processed information through an air interface.

Optionally, the first configuration information may be generated by the CU at the first protocol layer. For example, the first configuration information may be carried in an RRC message.

In S530, the first terminal device may receive, through an air interface, first configuration information that is sent by the first DU and that has been processed by the first DU, and parse out the first configuration information at the RRC layer.

The first configuration information is used to indicate the first serving cell set configured by the CU for the first terminal device. The first serving cell set indicated in the first configuration information is corresponding to the first serving cell set described in the foregoing description in S520, and includes at least one secondary cell. Optionally, the first configuration information may include a secondary cell list (Scell list). The one-to-one mapping relationship between secondary-cell identity information, a secondary-cell index, and secondary-cell frequency information is recorded in the secondary cell list.

Optionally, the secondary-cell identity information may include at least one of an ECGI or a PCI.

The first configuration information is used to notify the first terminal device of the first serving cell set and corresponding configuration information, so that the first terminal device receives subsequent secondary cell configuration information. For example, the first configuration information may be the foregoing secondary cell list. The one-to-one mapping relationship between secondary-cell identity information, a secondary-cell index, and secondary-cell frequency information is recorded in the secondary cell list. After receiving the first configuration information, the first terminal device may store the secondary cell list. Therefore, when subsequently receiving an activation/deactivation indication (namely, first indication information in the following description), the first terminal device can find, at a corresponding frequency based on the configuration information, an active secondary cell corresponding to the secondary-cell index.

Optionally, the first configuration information further indicating the status of the secondary cell.

The status of the secondary cell s the active state or the inactive state.

Specifically, the first configuration information may include an identity of each secondary cell and a status of the secondary cell, that is, the status of the secondary cell is indicated in an explicit manner. Alternatively, it may be defined in a protocol that the first configuration information includes only a secondary cell in the active state or a secondary cell in the inactive state. Correspondingly, the first configuration information may include only the secondary cell in the active state or the secondary cell in the inactive state, that is, the status of the secondary cell is indicated in an implicit manner.

Optionally, the first configuration information may be generated by the CU at the first protocol layer. For example, the first configuration information may be carried in an RRC message.

S540. The first DU determines, from the first serving cell set, a status of at least one first secondary cell in the first indication information.

In this embodiment of this application, the first DU is the DU of the primary cell of the first terminal device, may determine a status of each secondary cell for the first terminal device, and generate the first indication information based on a result of the determining. Specifically, the first DU may determine which secondary cell in the first serving cell set may be set to the active state in a current network condition, that is, a secondary cell that may be configured as a secondary cell for data transmission with the first terminal device; and the first DU may determine which secondary cell in the first serving cell set may be set to the inactive state, that is, a secondary cell that is not currently configured as a secondary cell for data transmission with the first terminal device.

For ease of differentiation and description, in this embodiment of this application, a secondary cell included in the first indication information is denoted as a first secondary cell. It can be understood that, the secondary cell included in the first indication information belongs to the first serving cell set. In other words, the secondary cell included in the first indication information may be a subset of the first serving cell set, or an entire set of the serving cell set.

In a possible design, the first indication information may include all secondary cells in the first serving cell set, and indicate a status of each secondary cell. In another possible design, the first indication information may include some secondary cells in the first serving cell set, and is used to indicate a status of each of the some secondary cells. In still another possible design, the first indication information may include some secondary cells in the first serving cell set, and the some secondary cells are determined by the first DU or the CU and are set to the active state or the inactive state.

Optionally, S540 specifically includes:

determining, by the first DU, the status of the at least one first secondary cell in the first indication information based on a measurement result.

The measurement result may be the measurement result described in S520. Specific content of the measurement result has been described in detail in S520. Details are not described herein again for brevity.

It can be understood that, when the RRC layer and the PDCP layer are deployed in the CU, and the RLC layer, the MAC layer, and the PHY layer are deployed in the first DU, the first DU may obtain the measurement results of different protocol layers from the first terminal device in different manners.

For an RRC layer measurement report from the first terminal device, the RRC layer measurement report may be carried in an RRC message, and therefore the first DU cannot directly parse out the RRC layer measurement report, but can forward the RRC layer measurement report to the CU, and the CU parses out the first measurement result at the RRC layer based on the measurement report. The CU sends the first measurement result to the first DU through the first communications interface. Optionally, the first measurement result may be carried in a first interface control plane message or a first interface user plane message.

For a PHY layer measurement report from the first terminal device, the PHY layer measurement report may be carried in a PHY layer message or a MAC layer message, and therefore the first DU can directly parse out the second measurement result when receiving the PHY layer measurement report.

It should be noted herein that, if the measurement result based on which the first DU determines an active/inactive state of each first secondary cell in the first serving cell set includes the second measurement result of the third protocol layer from the first terminal device, a measurement signal (for example, a downlink reference signal) needs to be configured to be transmitted on carriers corresponding to the secondary cells in the first serving cell set, so as to accurately obtain second measurement results of the third protocol layer that are obtained through measurement by the first terminal device for the secondary cells in the first serving cell set.

For a measurement report of an uplink channel that is obtained through measurement by the first DU based on a signal of the first terminal device, because the measurement report is obtained through measurement by the first DU, the first DU may directly obtain the third measurement result.

Therefore, the first DU determines the status of the at least one first secondary cell from the first serving cell set based on the measurement result, so that a relatively suitable secondary cell can be selected for carrier aggregation based on an uplink/downlink transmission status of the first terminal device in each secondary cell in the first serving cell set. Further, determining is performed based on one or more of the foregoing measurement results, and therefore accuracy of the determining can be improved.

It should be understood that the first DU may alternatively determine the active/inactive state of the first secondary cell in the first serving cell set based on other information. Further, a specific method in which the first DU determines the active/inactive state of the first secondary cell in the first serving cell set may be the same as a specific prior-art method in which a base station determines an active/inactive state of a first secondary cell in a first serving cell set. Details are not described herein for brevity.

It should be further understood that, the step, in S540, in which the first DU determines, from the first serving cell set, the first secondary cell that is set to the active/inactive state is only a possible implementation of determining the active/inactive state of the first secondary cell. Actually, in the case of cross-site carrier aggregation, the third DU may also determine a secondary cell managed by the third DU, to determine an active/inactive state of each secondary cell managed by the third DU. In this case, the first DU may determine only a secondary cell managed by the first DU, to determine an active/inactive state of at least one first secondary cell in the secondary cells managed by the first DU. It should be further understood that, a specific determining method and process of the third DU is similar to a specific determining method and process of the first DU. To avoid repetition, detailed description of the process is omitted herein.

It should be further noted that, when the first DU and the third DU determine the active/inactive state of each secondary cell managed by the first DU and the third DU, respectively, the third DU may send a result of the determining to the CU, and the CU forwards the result of the determining to the first DU, so that the first DU notifies the first terminal device of the result of the determining in S550.

S550. The first DU generates the first indication information, and sends the first indication information to the first terminal device, where the first indication information is used to indicate the status of the at least one first secondary cell.

It should be noted that, in the case of cross-site carrier aggregation, a first secondary cell in the first indication information may be the secondary cell managed by the first DU, or may be the secondary cell managed by the third DU.

By way of example and not limitation, the first indication information includes any one of the following:

a first secondary cell that is set to the active state;

a first secondary cell that is set to the inactive state; or a first secondary cell and a status of the first secondary cell.

Optionally, the secondary cell may be indicated by using a secondary-cell index.

It has been described in S520 that the first terminal device may store the one-to-one mapping relationship between secondary-cell identity information, a secondary-cell index, and secondary-cell frequency information based on the received first configuration information. Therefore, after receiving the first indication information, the first terminal device may determine an active/inactive first secondary cell based on an index, indicated in the first indication information, of the first secondary cell that is set to the active/inactive state. After receiving the first indication information, the first terminal device may receive a physical downlink control channel (physical downlink control channel, PDCCH) on a corresponding component carrier based on a first secondary cell that is set to the active state and that is indicated in the first indication information, and transmit data based on a resource scheduled for the first terminal device. In addition, a measurement report may be further transmitted periodically or aperiodically.

In this embodiment of the present invention, after receiving the first indication information, the first terminal device may update a status of the at least one first secondary cell in a serving cell set based on the status, indicated in the first indication information, of the at least one first secondary cell.

The update herein means that, a current status of each first secondary cell is updated based on a status, indicated in the received first indication information, of the first secondary cell, but the current status of the first secondary cell is not necessarily changed. For example, when the status indicated in the first indication information is the same as the current status, the current status does not need to be changed; and when the status indicated in the first indication information is different from the current status, the current status needs to be changed. For example, if a secondary cell (for example, a secondary cell #A, namely, an example of the first secondary cell) is in the active state, and the first indication information indicates that the secondary cell is in the inactive state, the secondary cell #A is updated to the inactive state. If a secondary cell (for example, a secondary cell #B, namely, another example of the first secondary cell) is in the inactive state, and the first indication information indicates that the secondary cell is in the active state, the secondary cell #B is updated to the active state. If a secondary cell (for example, a secondary cell #C, namely, still another example of the first secondary cell) is in the active state, and the first indication information indicates that the secondary cell is in the active state, or a secondary cell (for example, a secondary cell #D, namely, yet another example of the first secondary cell) is in the inactive state, and the first indication information indicates that the secondary cell is in the inactive state, a current status of the secondary cell #C and a current status of the secondary cell #D are not changed. For brevity of the following description, description on a same or similar case is omitted.

It should be understood that, a processing action of the first terminal device after determining a secondary cell that is set to the active state is the same as a processing action of a terminal device in the prior art. Details are not described herein for brevity.

Optionally, the first indication information may be generated by the first DU at the second protocol layer. For example, the first indication information may be carried in a MAC control element (control element, CE).

In other words, the first indication information is sent by using a layer 2 message, so that an active/inactive secondary cell is adjusted in real time based on a network condition, thereby enhancing real-time performance of configuration validation.

For the first configuration information in S530, the first configuration information may be carried in an RRC message. In other words, the CU may indicate the first serving cell set to the first terminal device by using the RRC message, so that the first terminal device obtains configuration information of the secondary cells in the first serving cell set. Subsequently, the first DU may send the first indication information to the first terminal device by using a MAC CE, to indicate, in real time, a secondary cell that is set to the active/inactive state, so that the first terminal device may transmit data based on the first indication information by using an active secondary cell, thereby implementing carrier aggregation.

In addition, it has been described in the foregoing description that a secondary cell in the first serving cell set and the primary cell of the first terminal device may belong to a same DU, or may belong to different DUs. Further, it is assumed that a DU of a secondary cell whose DU is different from a DU of the primary cell of the first terminal device is the third DU. Therefore, a secondary cell that may be set to the active state may be a cell in the first DU, or may be a cell in the third DU.

Optionally, the method 500 further includes:

S560. The first DU sends third indication information to the CU, where the third indication information is used to notify the CU of the at least one first secondary cell and the status of the at least one first secondary cell that are in the first indication information.

In other words, after determining the first secondary cell in the active/inactive state for the first terminal device, the first DU may notify the CU of the first secondary cell, so that the CU maintains an active/inactive state of the secondary cell of the first terminal device.

Optionally, the gird indication information may be generated by the first DU based on a protocol supported by the first communications interface (for example, an F1 interface). For example, the third indication information may be carried in an F1 interface control plane (denoted as an F1CP) message, and further, the F1 interface control plane message is an F1AP message. Alternatively, the third indication information may be carried in an F1 interface user plane (denoted as an F1UP) message. Optionally, the F1 interface control plane message is carried in a transport layer protocol of SCTP, and the F1 interface user plane message is carried in a transport layer protocol of GTP-U.

It should be specially noted that, in the case of cross-site carrier aggregation, the third indication information may further include the secondary cell managed by the third DU. Optionally, the method further includes: sending, by the CU, fourth indication information to the third DU, where the fourth indication information is used to instruct the third DU to configure, for the first terminal device, at least one secondary cell, set to the active/inactive state, in the secondary cells managed by the third DU.

Through the foregoing steps, the CU and the first DU complete carrier aggregation configuration for the first terminal device.

Therefore, in this embodiment of this application, the CU generates the first configuration information including the first serving cell set at the first protocol layer, and indicates, by using the first DU, the first configuration information including the first serving cell set to the terminal device; and the first DU generates the first indication information at the second protocol layer, and sends the first indication information to notify the first terminal device of the active/inactive state of the at least one first secondary cell, so that after receiving the first indication information, the first terminal device may update an active/inactive state of the secondary cell, and transmit data by using an active secondary cell. This implements configuration of carrier aggregation for a terminal device in a CU-DU architecture, and helps increase a transmission bandwidth of the terminal device. In addition, in this embodiment of this application, the first DU determines the active/inactive state of the at least one first secondary cell, so that the first indication information can be directly generated based on a result of the determining. This is relatively simple and convenient.

The following describes a communication method 600 provided in another embodiment of this application in detail with reference to FIG. 6.

As shown in FIG. 6, the method 600 includes the following steps.

S610. A first terminal device establishes an RRC connection to a first cell in a first DU.

S620. The CU configures a first serving cell set for the first terminal device, and sends configuration information (denoted as second configuration information for ease of differentiation and description) of the first serving cell set to the first DU.

Optionally, S620 may be alternatively as follows: The first DU configures a first serving cell set for the first terminal device, and sends configuration information (denoted as third configuration information for ease of differentiation and description) of the first serving cell set to the CU. Further, optionally, the CU sends a first acknowledgment message to the first DU.

For ease of understanding, only a process in which the CU sends the second configuration information to the first DU is shown in the figure, and a process in which the first DU sends the third configuration information to the CU and the CU sends the first acknowledgment message to the first DU is not shown, but this shall not constitute any limitation on this application.

S630. The CU generates first configuration information, and the first DU forwards the first configuration information to the first terminal device.

Optionally, the first configuration information is carried in an RRC message.

It should be understood that, a processing procedure of S610 to S630 is the same as a processing procedure of S510 to S530 in the method 500. Details are not described herein again for brevity.

S640. The CU determines at least one first secondary cell and a status of the at least one first secondary cell that are in second indication information.

In this embodiment of this application, the CU may be configured to determine an active/inactive state of the at least one first secondary cell from the first serving cell set. Specifically, the CU may determine which secondary cell in the first serving cell set may be set to the active state in a current network condition, that is, a secondary cell that may be configured as a secondary cell for data transmission with the first terminal device; and the CU may determine which secondary cell in the first serving cell set may be set to the inactive state, that is, a secondary cell that is not currently configured as a secondary cell for data transmission with the first terminal device.

Optionally, the CU may determine, based on a measurement result, the at least one first secondary cell and the status of the at least one first secondary cell that are in the second indication information.

The measurement result may be the measurement result described in S620. Specific content of the measurement result has been described in detail in S520 in the method 500. Details are not described herein again for brevity.

Therefore, the CU determines the active/inactive state of the at least one first secondary cell based on the measurement result, so that a relatively suitable secondary cell can be selected for carrier aggregation based on an uplink/downlink transmission status of the first terminal device in each secondary cell in the first serving cell set. Further, the CU may perform determining based on a first measurement result of a first protocol layer from the first terminal device, or may perform determining based on a second measurement result of a second protocol layer of the first terminal device reported by the first DU and a third measurement result of an uplink channel. This helps improve validity of the determining.

It should be understood that the CU may alternatively determine an active/inactive state of each secondary cell in the first serving cell set based on other information. A specific method in which the CU determines the active/inactive state of each secondary cell in the first serving cell set may be the same as a specific prior-art method in which a base station determines an active/inactive state of each secondary cell in a first serving cell set. Details are not described herein for brevity.

S650. The CU generates the second indication information, and sends the second indication information to the first DU, where the second indication information includes information about the status of the at least one first secondary cell.

After determining the active/inactive state of the at least one first secondary cell in the first serving cell set, the CU may generate information (denoted as the second indication information for ease of differentiation) used to indicate the active/inactive state of the at least one first secondary cell in the first serving cell set.

Optionally, the CU may generate the second indication information based on a protocol supported by a first communications interface. For example, the second indication information may be carried in an F1 interface control plane (denoted as an F1CP) message, or may be carried in an F1 interface user plane (denoted as an F1UP) message.

The CU sends the second indication information to the first DU through the first communications interface, and the first DU may parse the second indication information based on the protocol supported by the first communications interface, so as to determine the status of the at least one first secondary cell.

Optionally, the second indication information and the second configuration information may be carried in a same message. For example, the second indication information and the second configuration information may be carried in a same F1 interface control plane message.

S660. The first DU generates first indication information based on the second indication information, and sends the first indication information to the first terminal device, where the first indication information includes the information about the status of the at least one first secondary cell.

The first DU may generate the first indication information based on the status, indicated in the second indication information, of each first secondary cell.

The first DU sends the first indication information to the first terminal device through an air interface, to notify the first terminal device of the status of the at least one first secondary cell, so that the first terminal device updates a status of the at least one first secondary cell in the first serving cell set, thereby implementing carrier aggregation for the first terminal device.

Optionally, the first indication information is carried in a MAC CE.

It should be understood that, a processing procedure of S660 is the same as a processing procedure of S550 in the method 500. Details are not described herein again for brevity.

Optionally, the method 600 further includes:

S680. The first DU sends third indication information to the CU, where the third indication information is used to notify the CU of the at least one first secondary cell and the status of the at least one first secondary cell that are in the first indication information.

In other words, after determining the active/inactive state of the at least one first secondary cell for the first terminal device, the first DU may notify the CU of the active/inactive state, so that the CU maintains an active/inactive state of the secondary cell of the first terminal device.

Optionally, the third indication information may be generated by the first DU based on a protocol supported by a first communications interface (for example, an F1 interface). For example, the third indication information may be carried in an F1 interface control plane (denoted as an F1CP) message, and further, the F1 interface control plane message is an F1AP message. Alternatively, the third indication information may be carried in an F1 interface user plane (denoted as an F1UP) message. Optionally, the F1 interface control plane message is carried in a transport layer protocol of SCTP, and the F1 interface user plane message is carried in a transport layer protocol of GTP-U.

It should be specially noted that, in a case of cross-site carrier aggregation, the third indication information may further include a secondary cell managed by a third DU. Optionally, the method further includes: sending, by the CU, fourth indication information to the third DU, where the fourth indication information is used to instruct the third DU to configure, for the first terminal device, at least one secondary cell, set to the active/inactive state, in the secondary cells managed by the third DU.

Through the foregoing steps, the CU and the first DU complete carrier aggregation configuration for the first terminal device.

Therefore, in this embodiment of this application, the CU, generates the first configuration information including the serving cell set at the first protocol layer, and indicates, by using the first DU, the first configuration information including the serving cell set to the terminal device; and the first DU generates the first indication information at the second protocol layer, and sends the first indication information to notify the first terminal device of the active/inactive state of the at least one first secondary cell, so that after receiving the first indication information, the first terminal device may update an active/inactive state of the secondary cell, and transmit data by using an active secondary cell. This implements configuration of carrier aggregation for a terminal device in a CU-DU architecture, and helps increase a transmission bandwidth of the terminal device.

The following describes, in detail with reference to FIG. 7, a communication method 700 provided in still another embodiment of this application. It should be understood that, the communication method 700 shown in FIG. 7 may be a subsequent process of the communication method 500 or 600 shown in FIG. 5 or FIG. 6, or may be a process that is simultaneously performed with the communication method 500 or 600 shown in FIG. 5 or FIG. 6. This is not specifically limited in this application. Therefore, the method 700 may include some or all steps in the communication method 500 or the communication method 600. In this embodiment, to avoid repetition, description of the steps in the communication method 500 or the communication method 600 is omitted. In the communication method 700, it is assumed that the first terminal device has established an RRC connection to a first cell in a first DU.

As shown in FIG. 7, the method 700 includes the following steps.

S710. The first terminal device accesses a primary secondary cell through a random access process, to communicate with a plurality of base station systems by using a dual connectivity or multi-connectivity technology.

Specifically, after the first terminal device establishes the RRC connection to the first cell in the first DU, the first DU may add the primary secondary cell and a secondary cell for the first terminal device by using an RRC message. For a definition of the primary secondary cell, refer to a definition in an existing protocol (for example, an LTE protocol). To be specific, the primary secondary cell may be: a cell that is in a secondary cell group (SCG) and that is used to perform a random access process with a terminal device during an SCG change process, or a cell that is used to perform initial physical uplink shared channel (PUSCH) transmission when the random access process is skipped. The first terminal device may access the primary secondary cell through a non-contention-based random access process.

It should be noted that, different from the foregoing description in the method 500 and the method 600, after accessing the primary secondary cell, the first terminal device does not need to establish an RRC connection to a second DU. In other words, the first terminal device may receive a MAC layer message (for example, a MAC CE) and a PHY layer message that are sent by the second DU, and receive an RRC layer message (for example, an RRC message) from the first DU.

S720. A CU configures a second serving cell set for the first terminal device, and sends configuration information (denoted as fourth configuration information for ease of differentiation and description) of the second serving cell set to the second DU.

Specifically, the fourth configuration information includes the second serving cell set configured by the CU for the first terminal device, and the second serving cell set may be a set of cells that are in cells managed by the second DU and that may be configured as secondary cells of the first terminal device. In other words, in candidate secondary cells configured by the CU for the first terminal device, some candidate secondary cells may be managed by the second DU. Therefore, the CU sends the fourth configuration information to the second DU, so that the second DU performs protocol stack configuration. It can be understood that the second DU is a DU of the primary secondary cell of the first terminal device. Optionally, the second serving cell set includes the primary secondary cell and other secondary cells.

Optionally, the fourth configuration information is generated by the CU based on a protocol supported by a first communications interface (for example, an F1 interface). For example, the fourth configuration information may be carried in an F1 interface control plane (denoted as an F1CP) message, and further, the F1 interface control plane message is an F1AP message. Alternatively, the fourth configuration information may be carried in an F1 interface user plane (denoted as an F1UP) message. Optionally, the F1 interface control plane message is carried in a transport layer protocol of SCTP, and the F1 interface user plane message is carried in a transport layer protocol of GTP-U.

It should be understood that, specific content included in the fourth configuration information and a function of the fourth configuration information are similar to those of the second configuration information described in the foregoing description, and a specific process of S720 is similar to a specific process of S520. To avoid repetition, specific description of the step is omitted herein.

Optionally, S720 may be alternatively as follows: The first DU configures a second serving cell set for the first terminal device, and sends configuration information (denoted as fifth configuration information for ease of differentiation and description) of the second serving cell set to the CU. Further, optionally, the CU sends second acknowledgment information to the first DU.

It should be understood that, specific content included in the fifth configuration information and a function of the fifth configuration information are similar to those of the third configuration information described in the foregoing description, specific content included in the second acknowledgment information and a function of the second acknowledgment information are similar to those of the first acknowledgment message in the foregoing description, and a specific process in which the first DU configures the second serving cell set for the first terminal device is similar to a specific process of S520. To avoid repetition, specific description of the step is omitted herein.

In addition, it should be noted that for ease of understanding, only a process in which the CU sends the fourth configuration information to the second DU is shown in the figure, and a process in which the first DU sends the fifth configuration information to the CU is not shown, but this shall not constitute any limitation on this application.

Optionally, the method 700 further includes the following step:

S730. The CU generates sixth configuration information, and the first DU forwards the sixth configuration information to the first terminal device.

Specifically, the sixth configuration information includes the second serving cell set configured by the CU for the first terminal device, and the second serving cell set may be a set of cells that are in the cells managed by the second DU and that are configured as secondary cells of the first terminal device.

It can be learned from the foregoing description that, the sixth configuration information sent by the CU to the first terminal device is information generated at a first protocol layer. In this embodiment of this application, the sixth configuration information is carried in an RRC message. Therefore, the sixth configuration information may be forwarded to the first terminal device by the first DU. Specifically, the first DU may perform at least processing of the second protocol layer on the received sixth configuration information, and forward processed information to the first terminal device.

The second serving cell set indicated in the sixth configuration information is corresponding to the second serving cell set included in the fourth configuration information described in S720 in the foregoing description.

Optionally, the sixth configuration information may be generated by the CU at the first protocol layer. For example, the sixth configuration information is carried in an RRC message.

It should be understood that, specific content included in the sixth configuration information and a function of the sixth configuration information are similar to those of the first configuration information described in the foregoing description, and a specific process of S730 is similar to a specific process of S530. To avoid repetition, specific description of the step is omitted herein.

S740. The second DU generates fifth indication information, and sends the fifth indication information to the first terminal device.

Specifically, the fifth indication information includes information about a status of at least one first secondary cell. The fifth indication information is used to instruct the first terminal device to update a status of the at least one first secondary cell. It can be understood that, the at least one first secondary cell in the fifth indication information is all or some secondary cells in the second serving cell set. For a relationship between the first secondary cell and the second serving cell set, refer to the foregoing description about a relationship between the first secondary cell and the first serving cell set in the method 500. To avoid repetition, details are not described herein again.

In this embodiment of this application, each secondary cell and a status thereof may be determined by the CU from the second serving cell set (which may be corresponding to S640 in the method 600), or may be determined by the second DU from the second serving cell set (which may be corresponding to S540 in the method 500).

Further, the CU or the second DU may determine the status of each secondary cell based on a measurement result.

Optionally, specific content of the measurement result may include at least one of the following:

a first measurement result of the first protocol layer from the first terminal device;

a second measurement result of a third protocol layer from the first terminal device; and a third measurement result of an uplink channel that is reported by the second DU and that is obtained through measurement based on a signal of the first terminal device.

The first protocol layer is a protocol layer above the second protocol layer. In this embodiment of this application, by way of example and not limitation, the first protocol layer may be an RRC layer or a protocol layer that has a similar radio resource management function. The third protocol layer may be a PHY layer or a protocol layer that has a similar function of providing a physical resource for data transmission.

Optionally, the fifth indication information may be generated by the second DU at the second protocol layer. For example, the fifth indication information is carried in a MAC CE sent by the second DU to the first terminal device.

It should be understood that, specific content and a function of the fifth indication information are similar to those of the first indication information described in the foregoing description, and a specific process of S740 may be similar to a specific process of S540 or S640. To avoid repetition, specific description of the step is omitted herein.

Optionally, the method 700 further includes the following step:

S750. The second DU sends sixth indication information to the CU, where the sixth indication information is used to notify the CU of the at least one first secondary cell and the status of the at least one first secondary cell that are in the fifth indication information.

Optionally, the sixth indication information may be generated by the second DU based on a protocol supported by the first communications interface (for example, an F1 interface). For example, the sixth indication information may be carried in an F1 interface control plane (denoted as an F1CP) message, and further, the F1 interface control plane message is an F1AP message. Alternatively, the sixth indication information may be carried in an F1 interface user plane (denoted as an F1UP) message. Optionally, the F1 interface control plane message is carried in a transport layer protocol of SCTP, and the F1 interface user plane message is carried in a transport layer protocol of GTP-U.

It should be understood that, specific content and a function of the sixth indication information are similar to those of the third indication information described in the foregoing description, and a specific process of the step has been described in detail in the foregoing description. To avoid repetition, specific description of the step is omitted herein.

Through the foregoing steps, the CU, the first DU, and the second DU complete carrier aggregation configuration for the first terminal device in a dual connectivity or multi-connectivity scenario.

Therefore, in this embodiment of this application, the CU generates the fourth configuration information including the second serving cell set at the first protocol layer, and indicates, by using the second DU, the fourth configuration information including the second serving cell set to the first terminal device; and the second DU generates the fifth indication information at the second protocol layer, and sends the fifth indication information to notify the first terminal device of the active/inactive state of the at least one first secondary cell, so that after receiving the fifth indication information, the first terminal device may transmit data by using an active secondary cell. This implements configuration of carrier aggregation for a terminal device in a CU-DU architecture, and helps increase a transmission bandwidth of the terminal device. Further, the method is also applicable to a multi-connectivity or dual connectivity scenario, and this helps increase a transmission bandwidth of the terminal device and improve mobility robustness.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes the communication methods in the embodiments of this application in detail with reference to FIG. 5 to FIG. 7, and the following describes apparatuses in the embodiments of this application in detail with reference to FIG. 8 to FIG. 12.

Figure 8:
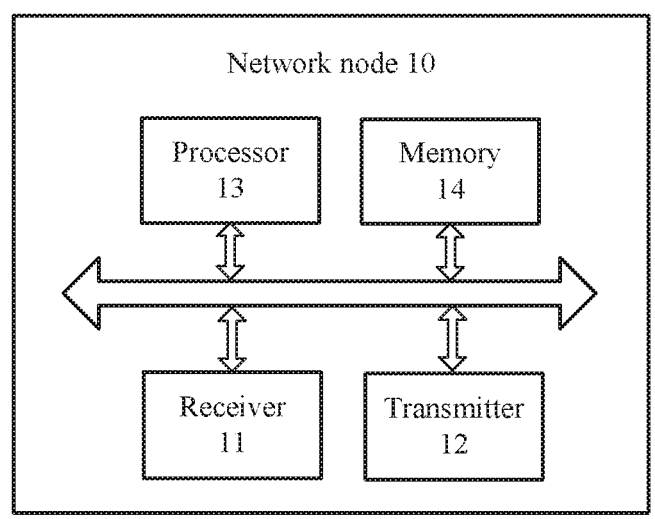
FIG. 8 is a schematic block diagram of a network node according to an embodiment of this application.

An embodiment of this application provides a network node. The following describes a structure and functions of the network node with reference to FIG. 8. FIG. 8 is a schematic block diagram of a network node 10 provided in this embodiment of this application. As shown in FIG. 8, the network node 10 includes a receiver 11, a transmitter 12, and a processor 13. Optionally, the network node 10 further includes a memory 14. The receiver 11, the transmitter 12, the processor 13, and the memory 14 communicate with each other through an inner connection path, to transfer a control signal and/or a data signal. The memory 14 is configured to store a computer program. The processor 13 is configured to invoke the computer program from the memory 14 and execute the computer program, so as to control the receiver 11 to receive a signal, and control the transmitter 12 to send a signal. When a program instruction stored in the memory 14 is executed by the processor 13, the receiver 11 is configured to receive first configuration information from a second network node. The first configuration information includes a serving cell set configured for a terminal device, and the serving cell set includes at least one secondary cell. The first configuration information further indicating a status of the secondary cell, and the status of the secondary cell is an active state or an inactive state. The first configuration information is generated by the second network node at a first protocol layer.

The transmitter 12 is configured to send the first configuration information to the terminal device.

The transmitter 12 is further configured to send first indication information. The first indication information includes information about a status of at least one first secondary cell, the first secondary cell belongs to the serving cell set, and the first indication information is generated by the first network node at a second protocol layer.

The processor 13 and the memory 14 may be combined into a processing apparatus. The processor 13 is configured to execute program code stored in the memory 14, to implement the foregoing functions. During specific implementation, the memory 14 may be integrated into the processor 13, or independent of the processor 13.

It should be understood that, the network node 10 may be corresponding to the first DU in the communication method 500 or 600 provided in the embodiments of the present invention, and the network node 10 may include modules configured to perform the method performed by the first DU in the communication method 500 in FIG. 5 or the communication method 600 in FIG. 6. Further, the modules of the network node 10 and the foregoing other operations and/or functions are separately for implementing corresponding processes of the communication method 500 in FIG. 5 or the communication method 600 in FIG. 6. For a specific process in which the modules perform the foregoing corresponding steps, refer to the foregoing description in the method embodiments with reference to FIG. 5 and FIG. 6. For brevity, details are not described herein again.

Figure 9:
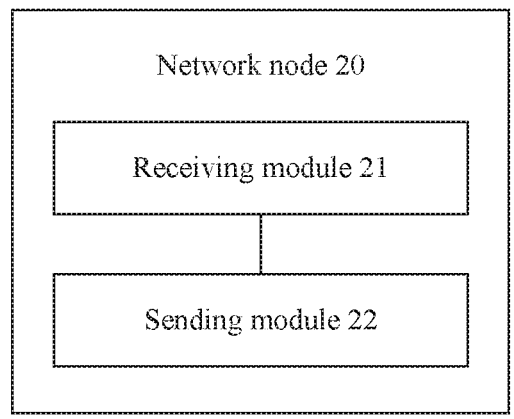
FIG. 9 is another schematic block diagram of a network node according to an embodiment of this application.

An embodiment of this application further provides a network node. The following describes a structure and functions of the network node with reference to FIG. 9. FIG. 9 is another schematic block diagram of a network node 20 provided in this embodiment of this application. As shown in FIG. 9, the network node 10 includes a receiving module 21 and a sending module 22.

The receiving module 21 and the sending module 22 may be implemented by software or hardware. When the receiving module 21 and the sending module 22 are implemented by hardware, the receiving module 21 may be the receiver 11 in FIG. 8, and the sending module 22 may be the transmitter 12 in FIG. 8.

Figure 10:
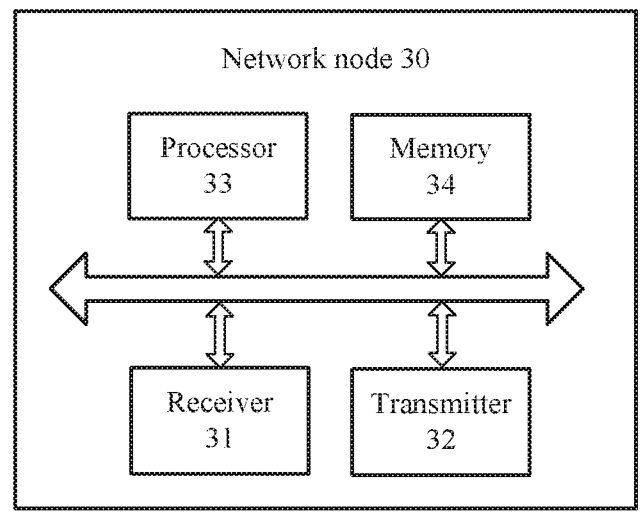
FIG. 10 is a schematic block diagram of a network node according to an embodiment of this application.

An embodiment of this application further provides a network node. The following describes a structure and functions of the network node with reference to FIG. 10. FIG. 10 is a schematic block diagram of a network node 30 in this embodiment of this application. As shown in FIG. 10, the network node 30 includes a receiver 31, a transmitter 32, and a processor 32. Optionally, the network node 30 further includes a memory 34. The receiver 31, the transmitter 32, the processor 33, and the memory 34 communicate with each other through an inner connection path, to transfer a control signal and/or a data signal. The memory 34 is configured to store a computer program. The processor 33 is configured to invoke the computer program from the memory 34 and execute the computer program, so as to control the receiver 31 to receive a signal, and control the transmitter 32 to send a signal. When a program instruction stored in the memory 34 is executed by the processor 33, the transmitter 32 is configured to send first configuration information to a first network node. The first configuration information includes a serving cell set configured for a terminal device, and the serving cell set includes at least one secondary cell. The first configuration information further indicating a status of the secondary cell, and the status of the secondary cell is an active state or an inactive state. The first configuration information is generated by the network node at a first protocol layer. The transmitter 32 is further configured to send second configuration information to the first network node. The second configuration information includes secondary-cell identity information and a secondary-cell index of the serving cell set configured by the network node for the terminal device.

The processor 33 and the memory 34 may be combined into a processing apparatus. The processor 33 is configured to execute program code stored in the memory 34, to implement the foregoing functions. During specific implementation, the memory 34 may be integrated into the processor 33, or independent of the processor 33.

It should be understood that, the network node 30 may be corresponding to the CU in the communication method 500 or 600 provided in the embodiments of the present invention, and the network node 30 may include modules configured to perform the method performed by the CU in the communication method 500 in FIG. 5 or the communication method 600 in FIG. 6. Further, the modules of the network node 30 and the foregoing other operations and/or functions are separately for implementing corresponding processes of the communication method 500 in FIG. 5 or the communication method 600 in FIG. 6. For a specific process in which the modules perform the foregoing corresponding steps, refer to the foregoing description in the method embodiments with reference to FIG. 5 and FIG. 6. For brevity, details are not described herein again.

Figure 11:
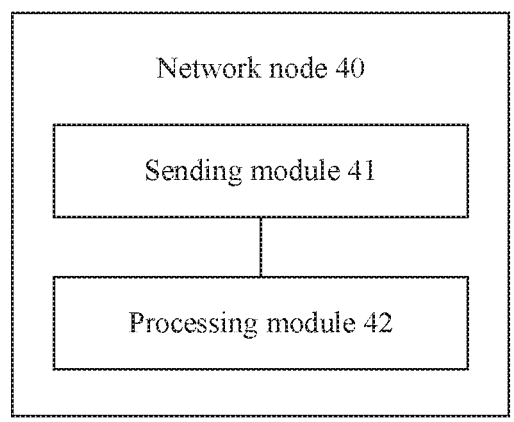
FIG. 11 is another schematic block diagram of a network node according to an embodiment of this application.

An embodiment of this application further provides a network node. The following describes a structure and functions of the network node with reference to FIG. 11. FIG. 11 is another schematic block diagram of a network node 40 according to an embodiment of this application. As shown in FIG. 11, the network node 40 includes a sending module 41 and a processing module 42.

The sending module 41 may be implemented by software or hardware. When the sending module 41 is implemented by hardware, the sending module 41 may be the transmitter 32 in FIG. 10.

It should be understood that, in the embodiments of this application, the processor may be a central processing unit (central processing unit, CPU), or the processor may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor or the processor may be any conventional processor, or the like.

It may be further understood that the memory in the embodiments of this application may be a volatile memory or a non-volatile memory, or may include a volatile memory and a non-volatile memory. The non-volatile memory may be a read-only memory (Read-Only Memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (Random Access Memory, RAM), and is used as an external cache. By way of example and not limitation, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

Figure 12:
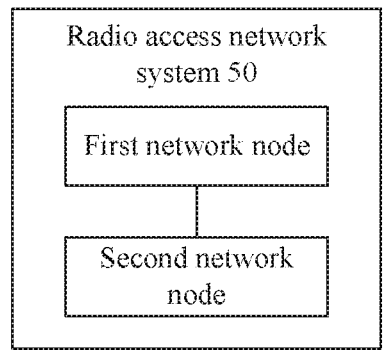
FIG. 12 is a schematic block diagram of a radio access network system according to an embodiment of this application.

An embodiment of this application further provides a radio access network system. FIG. 12 is a schematic block diagram of a radio access network system 50 in this embodiment of this application. As shown in FIG. 12, the radio access network system 50 includes a first network node and a second network node. The first network node may be the network node 10 shown in FIG. 8, and the second network node may be the network node 30 shown in FIG. 10; or the first network node may be the network node 20 shown in FIG. 9, and the second network node may be the network node 40 shown in FIG. 11.

All or some of the foregoing embodiments may be implemented through software, hardware, firmware, or any combination thereof. When software is used to implement the embodiments, the foregoing embodiments may be implemented fully or partially in a form of a computer program product. The computer program product includes one or more computer instructions. When the computer program instruction is loaded or executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, reference may be made to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method is applied to a radio access network system comprising a distributed unit (DU) and a centralized unit (CU), wherein the DU communicates with the CU through a first communications interface, and wherein the method comprises:
   receiving, by the DU, second configuration information from the CU, wherein the second configuration information comprises secondary cell identity information and a secondary cell index of a serving cell set configured by the CU for a terminal device;
   receiving, by the DU, first configuration information from the CU, wherein the first configuration information comprises a serving cell set configured for the terminal device, wherein the serving cell set comprises at least one secondary cell, wherein the first configuration information further indicates a status of the at least one secondary cell, wherein the status of the at least one secondary cell is an active state or an inactive state, and wherein the first configuration information is generated by the CU at a first protocol layer, wherein the first protocol layer is a radio resource control (RRC) layer;
   sending, by the DU, the first configuration information to the terminal device; and
   sending, by the DU, first indication information to the terminal device, wherein the first indication information comprises information about a status of at least one first secondary cell, wherein the at least one first secondary cell belongs to the serving cell set, and wherein the first indication information is generated by the DU at a second protocol layer, wherein the second protocol layer is a media access control (MAC) layer.

2. The method according to claim 1, wherein the method comprises:
   determining, by the DU, the status of the at least one first secondary cell in the first indication information.

3. The method according to claim 1, wherein at least the first protocol layer is deployed in the CU, wherein at least the second protocol layer and a third protocol layer are deployed in the DU, and the third protocol layer is a physical (PHY) layer.

4. A communication system, wherein the communication system is applied for a radio access network system, and wherein the communication system comprises:
   at least one processor; and
   one or more memories coupled to the at least one processor and storing programming instructions for execution by the at least one processor to:
      instruct a centralized unit (CU) to send second configuration information to a distributed unit (DU), wherein the second configuration information comprises secondary cell identity information and a secondary cell index of a serving cell set configured by the CU for a terminal device, and wherein the DU communicates with the CU through a first communications interface;
      instruct the CU to send first configuration information to the DU, wherein the first configuration information comprises a serving cell set configured for the terminal device, wherein the serving cell set comprises at least one secondary cell, wherein the first configuration information further indicates a status of the at least one secondary cell, wherein the status of the at least one secondary cell is an active state or an inactive state, and wherein the first configuration information is generated by the CU at a first protocol layer, wherein the first protocol layer is a radio resource control (RRC) layer;
      instruct the DU to send the first configuration information to the terminal device; and
      instruct the DU to send first indication information to the terminal device, wherein the first indication information comprises information about a status of at least one first secondary cell, wherein the at least one first secondary cell belongs to the serving cell set, and wherein the first indication information is generated by the DU at a second protocol layer, wherein the second protocol layer is a media access control (MAC) layer.

5. The communication system according to claim 4, wherein the one or more memories store the programming instructions for execution by the at least one processor to determine the status of the at least one first secondary cell in the first indication information.

6. The communication system according to claim 4, wherein at least the first protocol layer is deployed in the CU, wherein at least the second protocol layer and a third protocol layer are deployed in the DU, and wherein the third protocol layer is a physical (PHY) layer.

7. A communication apparatus, wherein the communication apparatus is applied to a radio access network system comprising the apparatus and a centralized unit (CU), wherein the communication apparatus communicates with the CU through a first communications interface, wherein the communication apparatus comprises at least one processor and a memory storing instructions, and wherein the instructions instruct the at least one processor to perform:
   receiving second configuration information from the CU, wherein the second configuration information comprises secondary cell identity information and a secondary cell index of a serving cell set configured by the CU for a terminal device;
   receiving first configuration information from the CU, wherein the first configuration information comprises a serving cell set configured for the terminal device, wherein the serving cell set comprises at least one secondary cell, wherein the first configuration information further indicates a status of the at least one secondary cell, wherein the status of the at least one secondary cell is an active state or an inactive state, and wherein the first configuration information is generated by the CU at a first protocol layer, wherein the first protocol layer is a radio resource control (RRC) layer;
   sending the first configuration information to the terminal device; and
   sending first indication information to the terminal device, wherein the first indication information comprises information about a status of at least one first secondary cell, wherein the at least one first secondary cell belongs to the serving cell set, and wherein the first indication information is generated by the communication apparatus at a second protocol layer, and wherein the second protocol layer is a media access control (MAC) layer.

8. The communication apparatus according to claim 7, wherein the instructions further instruct the at least one processor to perform:
   determining the status of the at least one first secondary cell in the first indication information.

9. The communication apparatus according to claim 7, wherein at least the first protocol layer is deployed in the CU, wherein at least the second protocol layer and a third protocol layer are deployed in the communication apparatus, and wherein the third protocol layer is a physical (PHY) layer.

10. A communication apparatus, wherein the communication apparatus is applied to a radio access network system comprising a distributed unit (DU) and the communication apparatus, wherein the DU communicates with the communication apparatus through a first communications interface, wherein the communication apparatus comprises at least one processor and a memory storing instructions, and wherein the instructions instruct the at least one processor to perform:
   sending first configuration information to the DU, wherein the first configuration information comprises a serving cell set configured for a terminal device, wherein the serving cell set comprises at least one secondary cell, wherein the first configuration information further indicates a status of the at least one secondary cell, wherein the status of the at least one secondary cell is an active state or an inactive state, wherein the first configuration information is generated by the communication apparatus at a first protocol layer, and wherein the first protocol layer is a radio resource control (RRC) layer; and
   sending second configuration information to the DU, wherein the second configuration information comprises secondary-cell identity information and a secondary-cell index of the serving cell set configured by the communication apparatus for the terminal device.

11. The communication apparatus according to claim 10, wherein the second configuration information further indicates the status of the at least one secondary cell, and wherein the status of the at least one secondary cell is the active state or the inactive state.

12. The communication apparatus according to claim 10, wherein the instructions further instruct the at least one processor to perform:
   determining the serving cell set based on a measurement result.

13. The communication apparatus according to claim 10, wherein at least the first protocol layer is deployed in the apparatus, wherein at least a second protocol layer and a third protocol layer are deployed in the DU, wherein the second protocol layer is a media access control (MAC) layer, and wherein the third protocol layer is a physical (PHY) layer.

* * * * *